US012802569B2

(12) United States Patent
Goto

(10) Patent No.: US 12,802,569 B2
(45) Date of Patent: Nov. 17, 2026

(54) DRIVER ASSISTANCE APPARATUS, VEHICLE, AND DRIVER ASSISTANCE METHOD

(71) Applicant: SUBARU CORPORATION, Tokyo (JP)

(72) Inventor: Ikuo Goto, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 19/052,617

(22) Filed: Feb. 13, 2025

(65) Prior Publication Data

US 2025/0191470 A1 Jun. 12, 2025

Related U.S. Application Data

(63) Continuation of application No. PCT/JP2023/030240, filed on Aug. 23, 2023.

(51) Int. Cl.
*G08G 1/16* (2006.01)
*G08G 1/01* (2006.01)

(52) U.S. Cl.
CPC ........... *G08G 1/166* (2013.01); *G08G 1/0125* (2013.01)

(58) Field of Classification Search
CPC ........ G08G 1/166; G08G 1/0125; G08G 1/09; G08G 1/16; B60W 40/04
See application file for complete search history.

(56) References Cited

U.S. PATENT DOCUMENTS

| | | | |
|---|---|---|---|
| 9,139,201 | B2 | 9/2015 | Nagata |
| 11,878,716 | B2 | 1/2024 | Xia et al. |
| 2019/0061764 | A1 | 2/2019 | Tokuhiro et al. |

FOREIGN PATENT DOCUMENTS

| | | | |
|---|---|---|---|
| JP | 2969174 | B1 | 11/1999 |
| JP | 2010-170517 | A | 8/2010 |
| JP | 5776838 | A | 9/2015 |

(Continued)

OTHER PUBLICATIONS

Federal Highway Administration, Driver Attitudes and Behaviors at Intersections and Potential Effectiveness of Engineering Countermeasures, US Department of Transportation, FHWA-HRT-05-078, 2005, pp. 1-20 (Year: 2005).*

(Continued)

*Primary Examiner* — Aniss Chad
*Assistant Examiner* — Chase L Cooley
(74) *Attorney, Agent, or Firm* — Rimon P.C.

(57) ABSTRACT

A driver assistance apparatus includes a processor. The processor acquires first data indicating that a prediction target vehicle is present, that second vehicles are present on one or more lanes ahead of a first vehicle, and that an entry space available for entry of the prediction target vehicle is present, among one or more spaces each formed by any adjacent two of the second vehicles on any common lane. When the prediction target vehicle is waiting at a waiting point on a non-priority road, the processor estimates waiting time for the prediction target vehicle. When the prediction target vehicle is traveling toward the waiting point, the processor estimates time to spare until the entry of the prediction target vehicle into the entry space. The processor predicts possibility of the entry of the prediction target vehicle into the entry space based on the waiting time or the time to spare.

13 Claims, 13 Drawing Sheets

(56) References Cited

FOREIGN PATENT DOCUMENTS

| | | | | | |
|---|---|---|---|---|---|
| JP | 2017-182206 | A | | 10/2017 | |
| JP | 2020050323 | A | * | 4/2020 | |
| JP | 2020-101986 | A | | 7/2020 | |
| JP | 7171808 | B2 | | 11/2022 | |
| WO | WO-2020053612 | A1 | * | 3/2020 | ............... G08G 1/16 |

OTHER PUBLICATIONS

International Search Report and Written Opinion dated Nov. 14, 2023, from corresponding International Application No. PCT/JP2023/030240, 10 pages.

* cited by examiner

DRIVER ASSISTANCE APPARATUS, VEHICLE, AND DRIVER ASSISTANCE METHOD

CROSS-REFERENCE TO RELATED APPLICATIONS

This application is continuation of International Application No. PCT/JP2023/030240, filed on Aug. 23, 2023, the entire contents of which are hereby incorporated by reference.

BACKGROUND

The disclosure relates to a driver assistance apparatus to be mounted on a vehicle, a vehicle, and a driver assistance method.

In recent years, as to vehicles such as automobiles, developments of automated driving control techniques have been in progress. The automated driving control techniques include allowing vehicles to travel automatically without drivers' driving operations. Moreover, various proposals have been made for driver assistance apparatuses that make various kinds of controls to assist a driver in making driving operations by using this kind of the automated driving control techniques, and such driver assistance apparatuses are widely put into practical use. Techniques related to such driver assistance apparatuses are disclosed in, for example, Japanese Patent Nos. 7171808 and 2969174, Japanese Unexamined Patent Application Publication (JP-A) No. 2020-101986, and Japanese Patent No. 5776838.

SUMMARY

An aspect of the disclosure provides a driver assistance apparatus including a processor. The processor is configured to predict behavior of a prediction target vehicle when a non-priority road is present ahead of a first vehicle and the prediction target vehicle is present stopped at a waiting point on the non-priority road or traveling toward the waiting point. The non-priority road merges with or intersects a priority road including one or more lanes on each side. The processor is configured to perform the following (A1), (A2), and (A3).

(A1) acquiring first data indicating that the prediction target vehicle is present, that second vehicles are present on one or more lanes ahead of the first vehicle, and that an entry space available for entry of the prediction target vehicle is present, among one or more spaces each formed by any adjacent two of the second vehicles on any common lane out of the one or more lanes ahead of the first vehicle (A2) when it is determined based on the acquired first data that the prediction target vehicle is waiting at the waiting point and that the entry space for the waiting prediction target vehicle is present, estimating waiting time for the prediction target vehicle at the waiting point based on the acquired first data, and when it is determined based on the acquired first data that the prediction target vehicle is traveling toward the waiting point and that the entry space for the traveling prediction target vehicle is present, estimating time to spare until the entry of the prediction target vehicle into the entry space based on the acquired first data (A3) predicting possibility of the entry of the prediction target vehicle into the entry space based on the waiting time or the time to spare An aspect of the disclosure provides a vehicle including a processor. The processor is configured to predict behavior of a prediction target vehicle when a non-priority road is present ahead of a first vehicle and the prediction target vehicle is present stopped at a waiting point on the non-priority road or traveling toward the waiting point. The non-priority road merges with or intersects a priority road including one or more lanes on each side. The processor is configured to perform the following (B1), (B2), and (B3).

(B1) acquiring data indicating that the prediction target vehicle is present, that second vehicles are present on one or more lanes ahead of the first vehicle, and that an entry space available for entry of the prediction target vehicle is present, among one or more spaces each formed by any adjacent two of the second vehicles on any common lane out of the one or more lanes ahead of the first vehicle (B2) when it is determined based on the acquired data that the prediction target vehicle is waiting at the waiting point and that the entry space for the waiting prediction target vehicle is present, estimating waiting time for the prediction target vehicle at the waiting point based on the acquired data, and when it is determined based on the acquired data that the prediction target vehicle is traveling toward the waiting point and that the entry space for the traveling prediction target vehicle is present, estimating time to spare until the entry of the prediction target vehicle into the entry space based on the acquired data (B3) predicting possibility of the entry of the prediction target vehicle into the entry space based on the waiting time or the time to spare An aspect of the disclosure provides a driver assistance method including predicting behavior of a prediction target vehicle when a non-priority road is present ahead of a first vehicle and the prediction target vehicle is present stopped at a waiting point on the non-priority road or traveling toward the waiting point. The non-priority road merges with or intersects a priority road including one or more lanes on each side. The driver assistance method includes the following (C1), (C2), and (C3).

(C1) acquiring data indicating that the prediction target vehicle is present, that second vehicles are present on one or more lanes ahead of the first vehicle, and that an entry space available for entry of the prediction target vehicle is present, among one or more spaces each formed by any adjacent two of the second vehicles on any common lane out of the one or more lanes ahead of the first vehicle (C2) when it is determined based on the acquired data that the prediction target vehicle is waiting at the waiting point and that the entry space for the waiting prediction target vehicle is present, estimating waiting time for the prediction target vehicle at the waiting point based on the acquired data, and when it is determined based on the acquired data that the prediction target vehicle is traveling toward the waiting point and that the entry space for the traveling prediction target vehicle is present, estimating time to spare until the entry of the prediction target vehicle into the entry space based on the acquired data (C3) predicting possibility of the entry of the prediction target vehicle into the entry space based on the waiting time or the time to spare An aspect of the disclosure provides a driver assistance apparatus including a processor. The processor is configured to predict behavior of a prediction target vehicle when a non-priority road is present ahead of a first vehicle and the prediction target vehicle is present stopped at a waiting point on the non-priority road or traveling toward the waiting point. The non-priority road merges with or intersects a priority road including one or more lanes on each side. The processor is configured to perform the following (D1), (D2), and (D3).

(D1) acquiring data indicating that the prediction target vehicle is present, that second vehicles are present on one or more lanes ahead of the first vehicle, and that an entry space available for entry of the prediction target vehicle is present, among one or more spaces each formed by any adjacent two of the second vehicles on any common lane out of the one or more lanes ahead of the first vehicle (D2) estimating, based on the acquired data, a first degree of congestion near the entry space on the priority road and a second degree of congestion extending, within the priority road, from a position of the first vehicle to near the entry space (D3) predicting possibility of the entry of the prediction target vehicle into the entry space based on the first degree of congestion and the second degree of congestion An aspect of the disclosure provides a driver assistance apparatus including a processor. The processor is configured to predict behavior of a prediction target vehicle when a non-priority road is present ahead of a first vehicle and the prediction target vehicle is present stopped at a waiting point on the non-priority road or traveling toward the waiting point. The non-priority road merges with or intersects a priority road including one or more lanes on each side. The processor is configured to perform the following (E1), (E2), and (E3).

(E1) acquiring data indicating that the prediction target vehicle is present, that second vehicles are present on one or more lanes ahead of the first vehicle, and that an entry space available for entry of the prediction target vehicle is present, among one or more spaces each formed by any adjacent two of the second vehicles on any common lane out of the one or more lanes ahead of the first vehicle (E2) estimating, based on the acquired data, a first degree of congestion near the entry space on the priority road and a third degree of congestion in an evaluation target region extending, within a same lane as the first vehicle, from a position of the first vehicle to near the entry space (E3) predicting possibility of the entry of the prediction target vehicle into the entry space based on the first degree of congestion and the third degree of congestion

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the disclosure.

DETAILED DESCRIPTION

Figure 1:
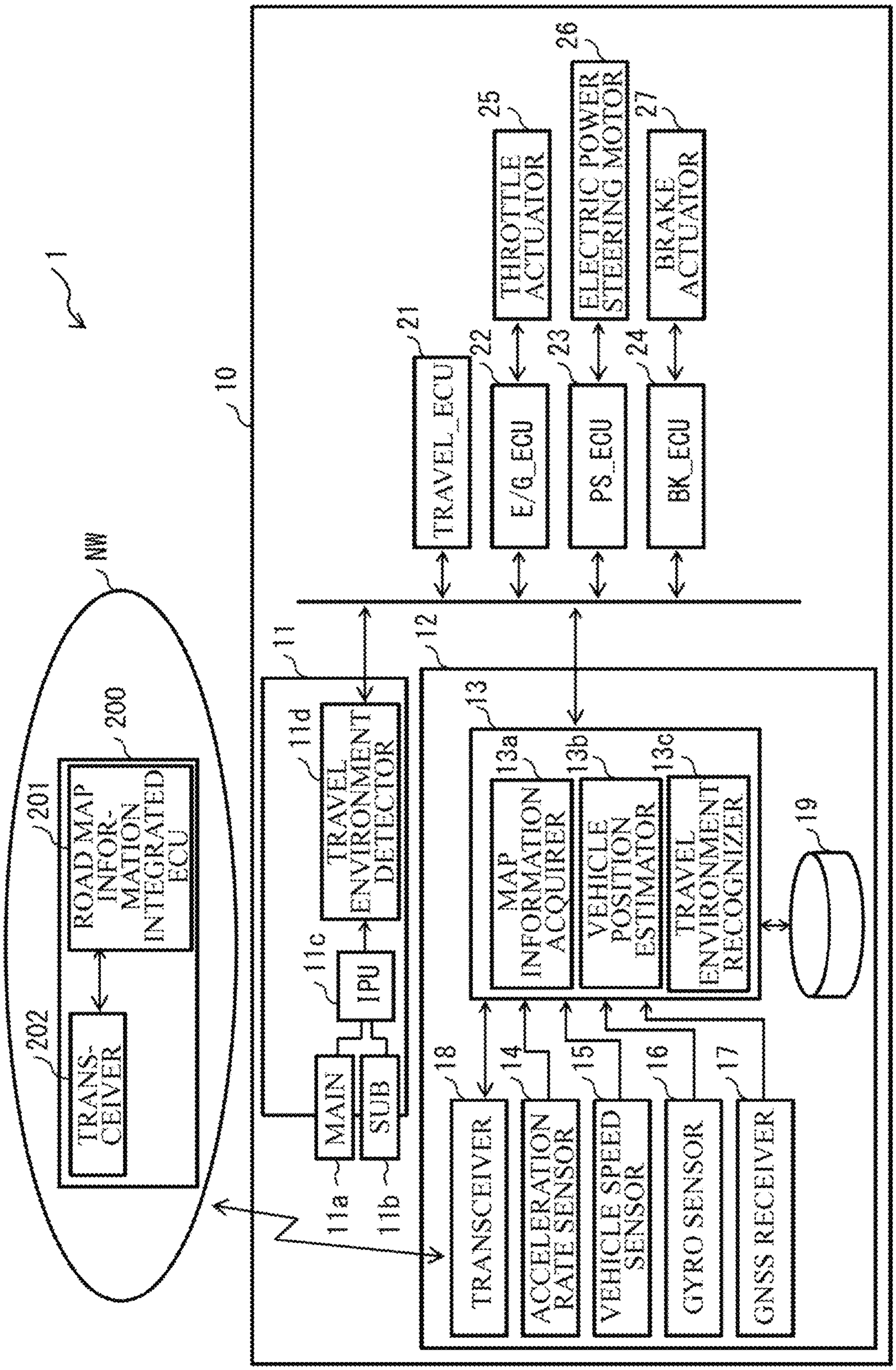
FIG. 1 is a block diagram of a schematic configuration example of a travel control system according to an embodiment of the disclosure.

In the following, some example embodiments of the disclosure are described in detail with reference to the accompanying drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description. In addition, elements that are not directly related to any embodiment of the disclosure are unillustrated in the drawings.

1. BACKGROUND

In recent years, as to vehicles such as automobiles, development of automated driving control techniques has been in progress. The automated driving control techniques include allowing vehicles to travel automatically without drivers' driving operations. Moreover, various proposals have been made for driver assistance apparatuses that make various kinds of controls to assist a driver in making driving operations by using this kind of the automated driving control techniques, and the driver assistance apparatuses are widely put into practical use. Techniques related to such driver assistance apparatuses are disclosed in, for example, Japanese Patent Nos. 7171808 and 2969174, JP-A No. 2020-101986, and Japanese Patent No. 5776838.

The invention described in Japanese Patent No. 7171808 discloses a technique including: predicting driving intentions of drivers of surrounding vehicles based on positions of the surrounding vehicles traveling around a subject vehicle and travel parameters such as a speed; and estimating presence or absence of possibility that any of the surrounding vehicles is going to merge into traffic on a lane on which the subject vehicle is traveling. The invention described in Japanese Patent No. 2969174 discloses a technique including: identifying a merged vehicle on a priority road; and when an inter-vehicle distance to the merged vehicle is equal to or less than a merging safety inter-vehicle distance, determining a traffic situation ahead of and behind the merged vehicle to determine whether the subject vehicle is to merge. The merged vehicle is a vehicle that is going to become a following vehicle after merging.

The invention described in JP-A No. 2020-101986 discloses a technique including: predicting behavior of moving bodies based on dynamic information regarding the moving bodies generated based on sensor data collected from multiple sensors; and determining a combination of behavior having possibility of collision between the moving bodies based on the predicted behavior. The invention described in Japanese Patent No. 5776838 discloses a technique including: predicting a moving body that may possibly rush out of a blind spot; and calculating a speed range in which a subject vehicle may possibly come into contact with the moving body, based on a predicted assumed speed of the moving body.

However, the inventions described in Japanese Patent Nos. 7171808 and 2969174, JP-A No. 2020-101986, and Japanese Patent No. 5776838 only include estimating a motion of the vehicle of the other party based on presence or absence of the possibility of collision by using parameters such as the vehicle speed of the vehicle of the other party and the inter-vehicle distance to the vehicle of the other party, without consideration of parameters highly correlated with a mental state of a driver of the vehicle of the other party. Thus, in the inventions described in Japanese Patent Nos. 7171808 and 2969174, JP-A No. 2020-101986, and Japanese Patent No. 5776838, it is difficult to predict possibility of merging, a lane change, etc. of the vehicle of the other party under an influence of the mental state of the driver of the vehicle of the other party even when the possibility of merging, a lane change, etc. of the vehicle of the other party is theoretically very low. As a result, the inventions described in Japanese Patent Nos. 7171808 and 2969174, JP-A No. 2020-101986, and Japanese Patent No. 5776838 end up in taking measures after the vehicle of the other party starts to merge, make a lane change, etc. This results in high possibility of an incident of collision between the subject vehicle and the vehicle of the other party.

As described, the existing inventions have a concern that it is difficult to predict the possibility of merging, a lane change, etc. of the vehicle of the other party under the influence of the mental state of the driver of the vehicle of the other party. As a result of intensive studies, the inventors of the application have created the technology that makes it possible to predict the possibility of merging, a lane change, etc. of the vehicle of the other party under the influence of the mental state of the driver of the vehicle of the other party. In the following, description is given of the background of the technology newly created, by giving virtual cases of traffic situations.

Figure 8:
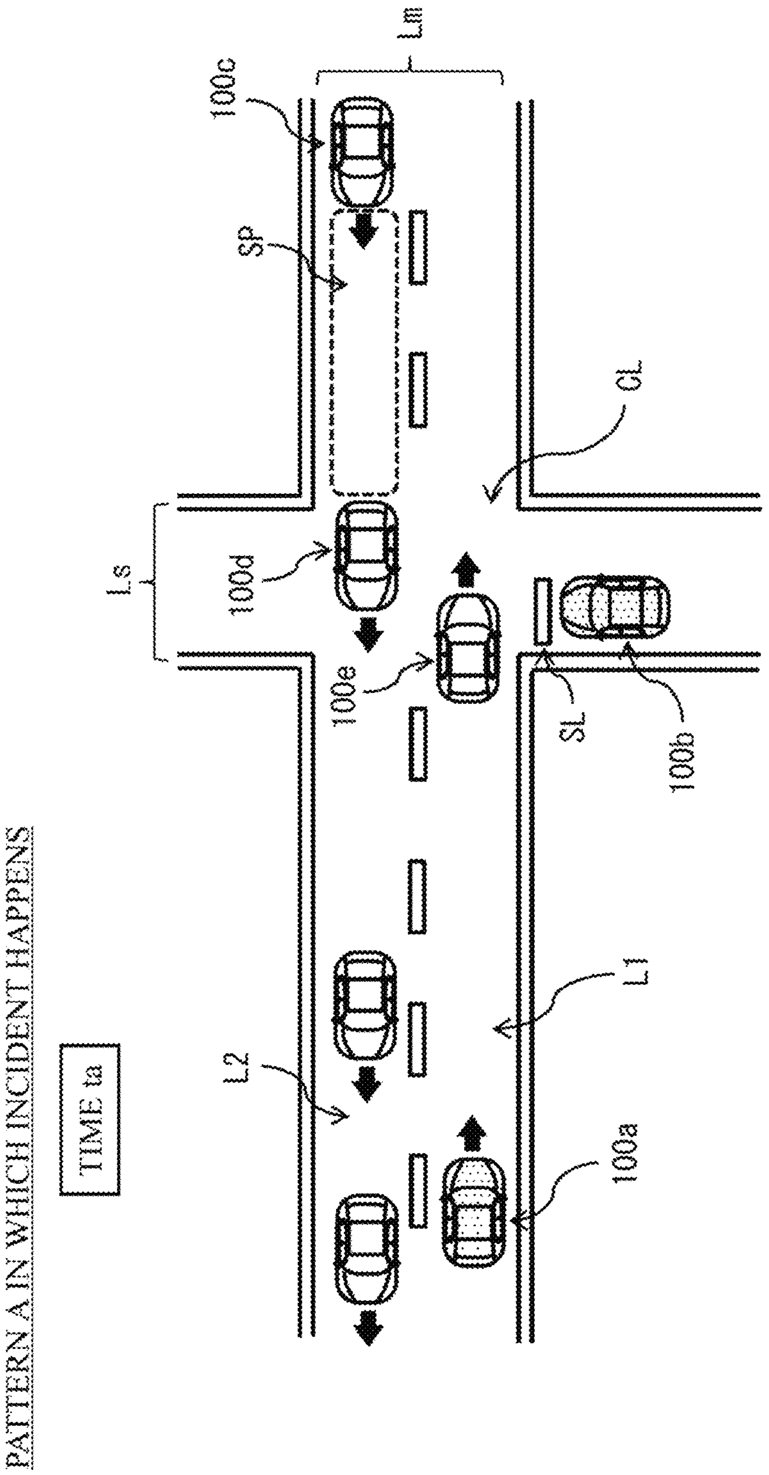
FIG. 8 is a diagram of an example of a traffic situation near the intersection.
Figure 9:
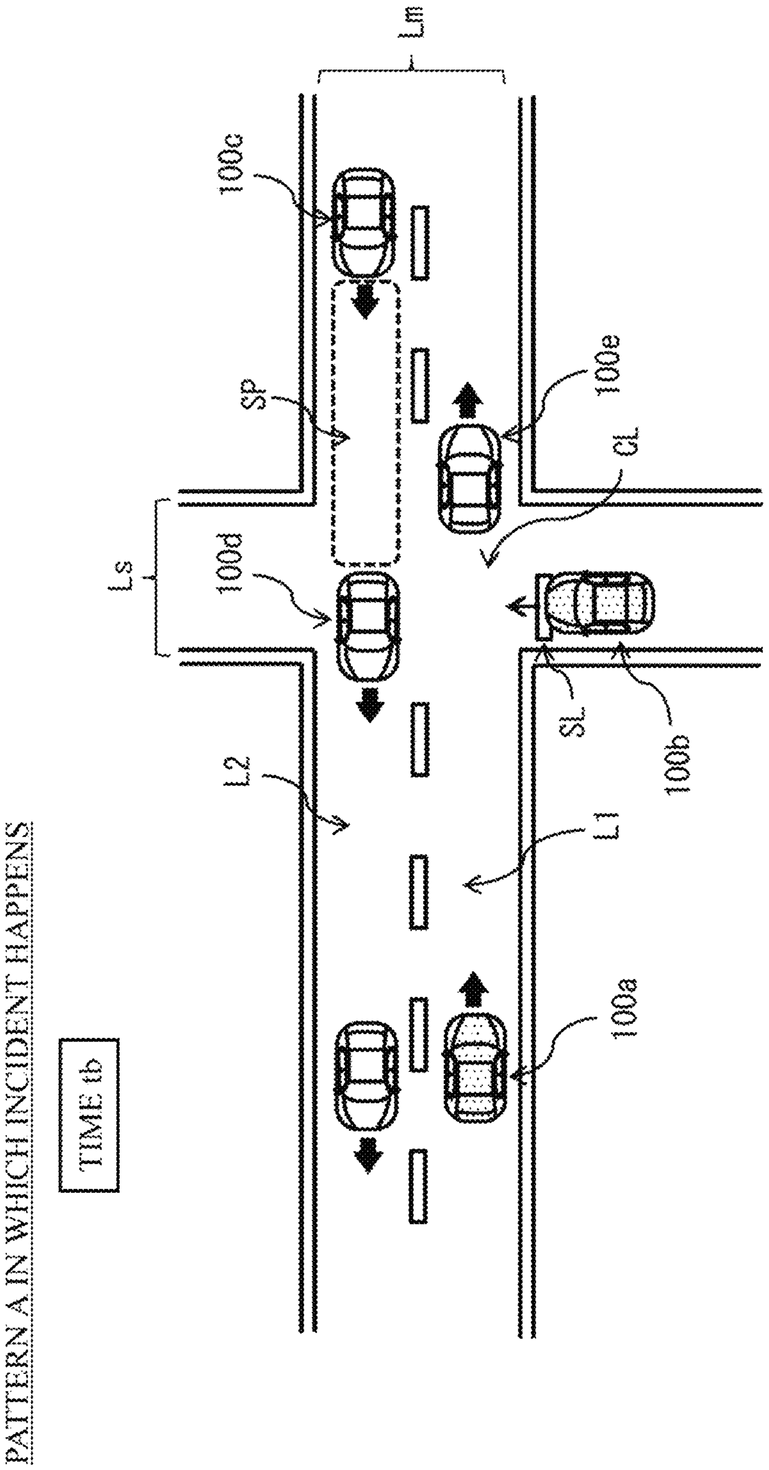
FIG. 9 is a diagram of an example of the traffic situation near the intersection.
Figure 10:
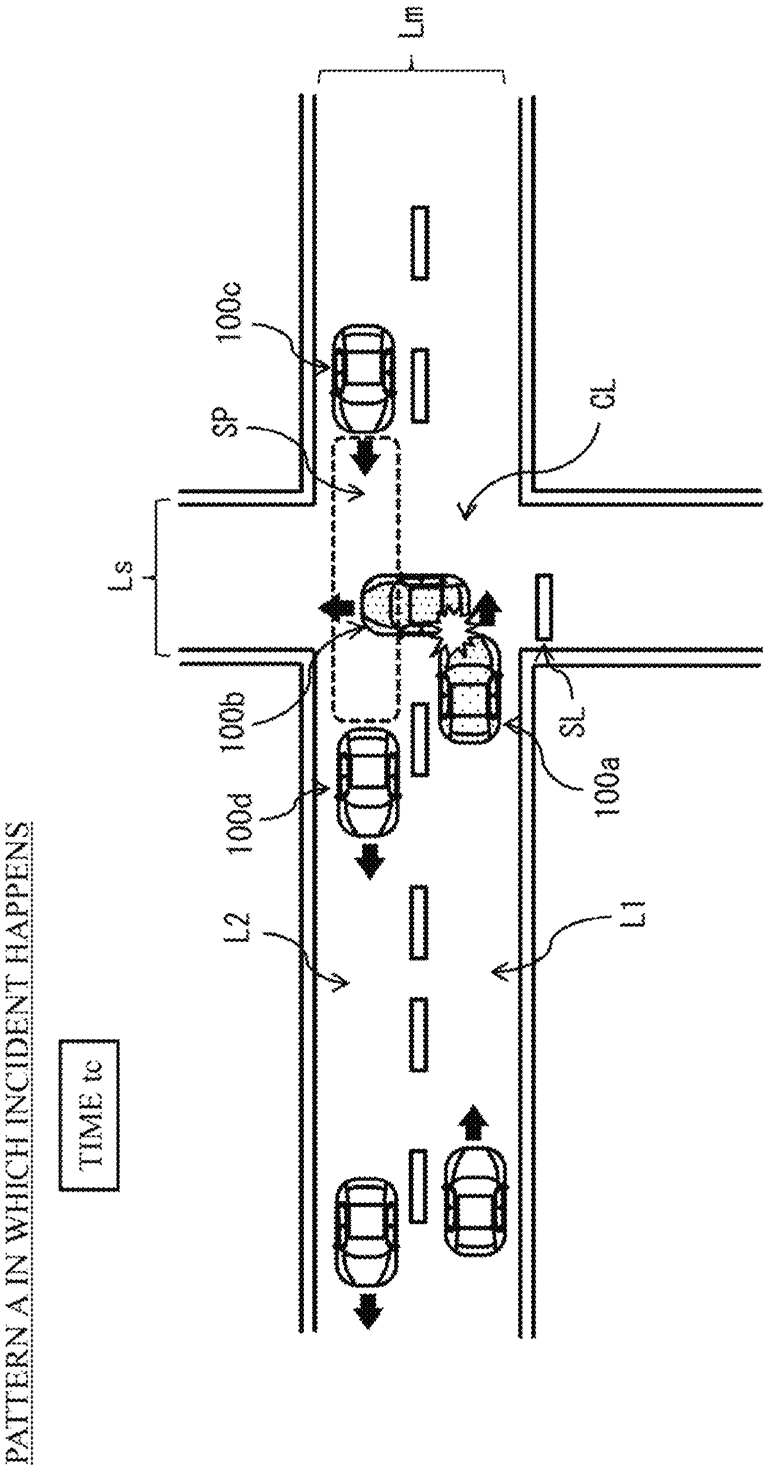
FIG. 10 is a diagram of an example of the traffic situation near the intersection.

FIGS. 8, 9, and 10 illustrate the virtual cases of the traffic situations. In FIGS. 8, 9, and 10, it is assumed that a vehicle (subject vehicle) 100*a* is traveling on a road including one lane on each side. The road including one lane on each side includes a travel lane L1 on which the vehicle 100*a* is traveling, and an opposite lane L2 provided along the travel lane L1 with a centerline in between. The road including one lane on each side includes an intersection CL ahead of the vehicle 100*a*. The road including one lane on each side is a priority road Lm in relation to a road intersecting this road including one lane on each side at the intersection CL. That is, the vehicle 100*a* is traveling on the priority road Lm. Meanwhile, the road intersecting the priority road Lm at the intersection CL is a non-priority road Ls in relation to the priority road Lm. On the non-priority road Ls, a vehicle (target vehicle) 100*b* is stopped in front of a stop line SL (waiting point) (time ta in FIG. 8). No traffic lights are installed at the intersection CL.

A driver of the vehicle 100*a* is aware that the vehicle 100*a* is traveling on the priority road Lm. Accordingly, the vehicle 100*a* is going to enter the intersection CL without decelerating. At this occasion, on the non-priority road Ls, the vehicle 100*b* is stopped in front of the stop line SL (waiting point). A driver of the vehicle 100*b* intends to pass through (cross or travel across) the intersection CL or turn left at the intersection CL (merge into traffic on the opposite lane L2). The driver of the vehicle 100*b*, on the non-priority road Ls, is looking out for timing of passing through the intersection CL or timing of turning left at the intersection CL while stopped in front of the stop line SL (waiting point). At this occasion, the driver of the vehicle 100*b* spots a large space SP between a vehicle 100*c* and a vehicle 100*d* on the lane (opposite lane L2) for leftward travel on the priority road Lm. The driver of the vehicle 100*b* decides to pass through the intersection CL or turn left at the intersection CL by using this space SP and starts to allow the vehicle 100*b* to enter the intersection CL (time tb in FIG. 9). At this occasion, the driver of the vehicle 100*b* is preoccupied with passing through the intersection CL or turning left at the intersection CL by using the space SP they have spotted, and inadvertently overlooks presence of the vehicle 100*a*.

As the stop time (waiting time) in front of the stop line SL becomes longer, the driver of the vehicle 100*b* becomes more irritated because they are unable to start the vehicle. Thus, normally, the driver of the vehicle 100*b* can recognize the presence of the vehicle 100*a*, but the irritated driver of the vehicle 100*b* inadvertently overlooks the presence of the vehicle 100*a* because of the irritation. As a result, the driver of the vehicle 100*b* starts the vehicle 100*b* without recognizing the presence of the vehicle 100*a*. In such a traffic situation, there is high possibility of an incident of collision between the vehicle 100*a* and the vehicle 100*b* as they meet at the intersection CL (time tc in FIG. 10).

Figure 11:
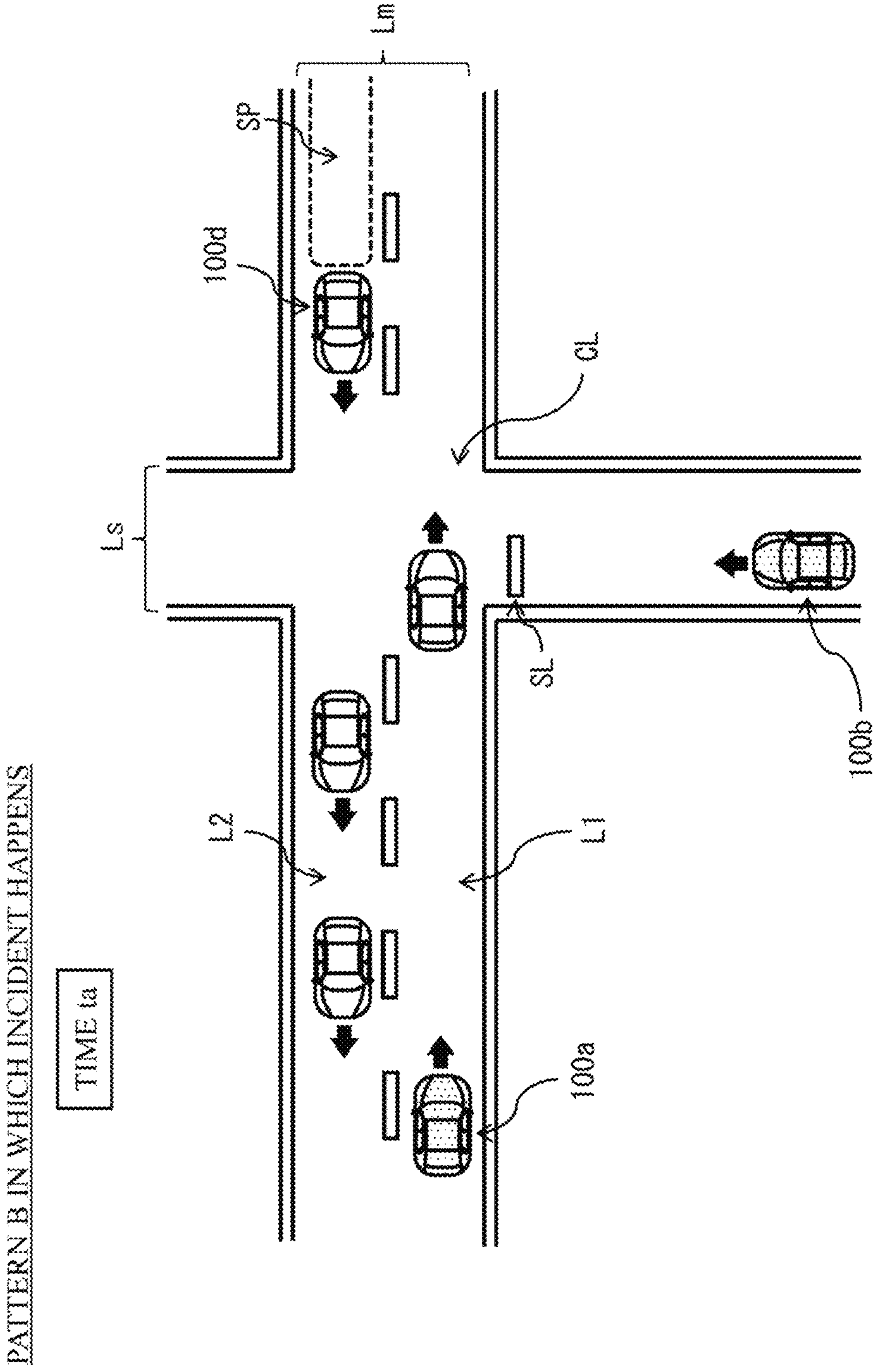
FIG. 11 is a diagram of an example of the traffic situation near the intersection.
Figure 12:
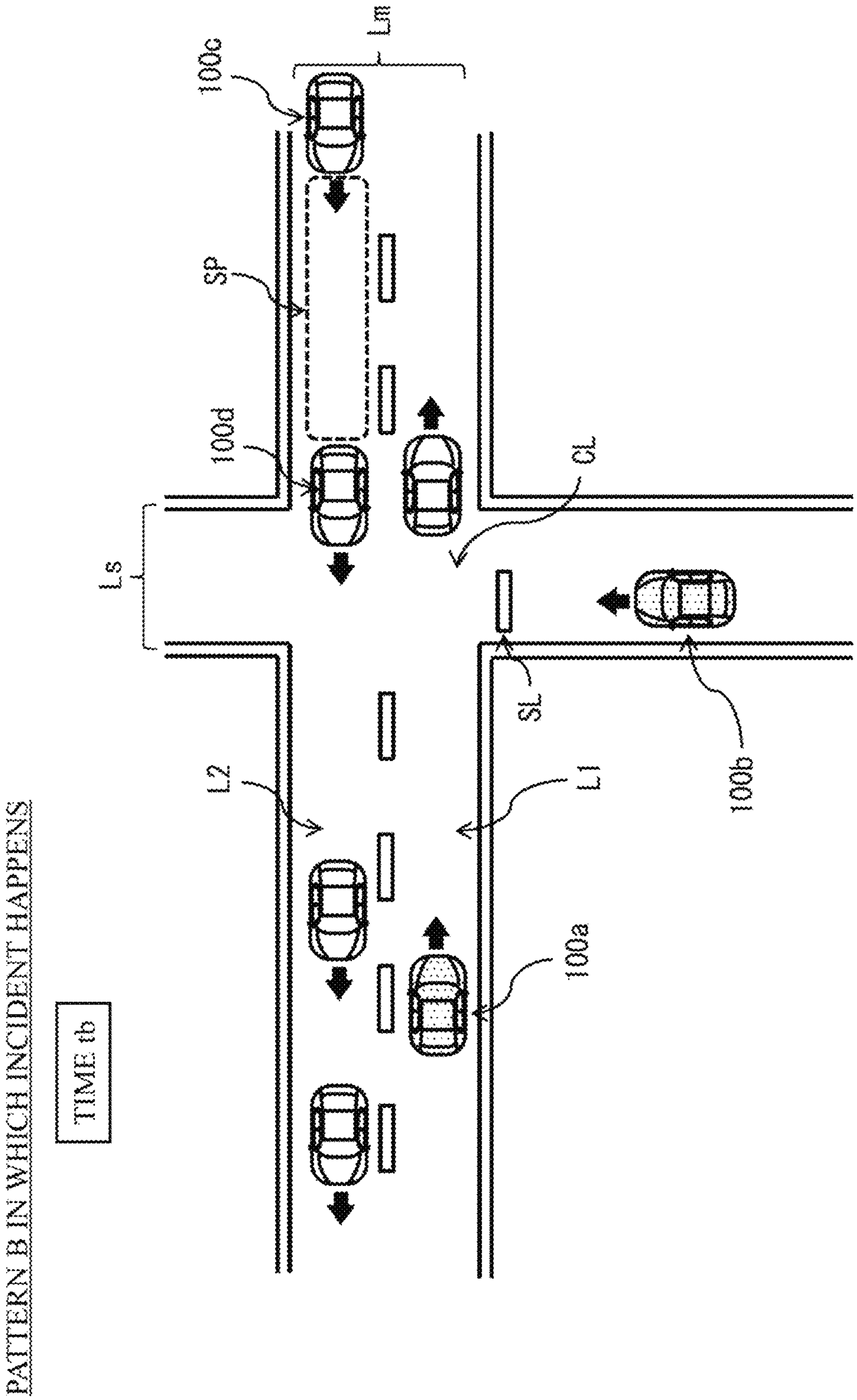
FIG. 12 is a diagram of an example of the traffic situation near the intersection.
Figure 13:
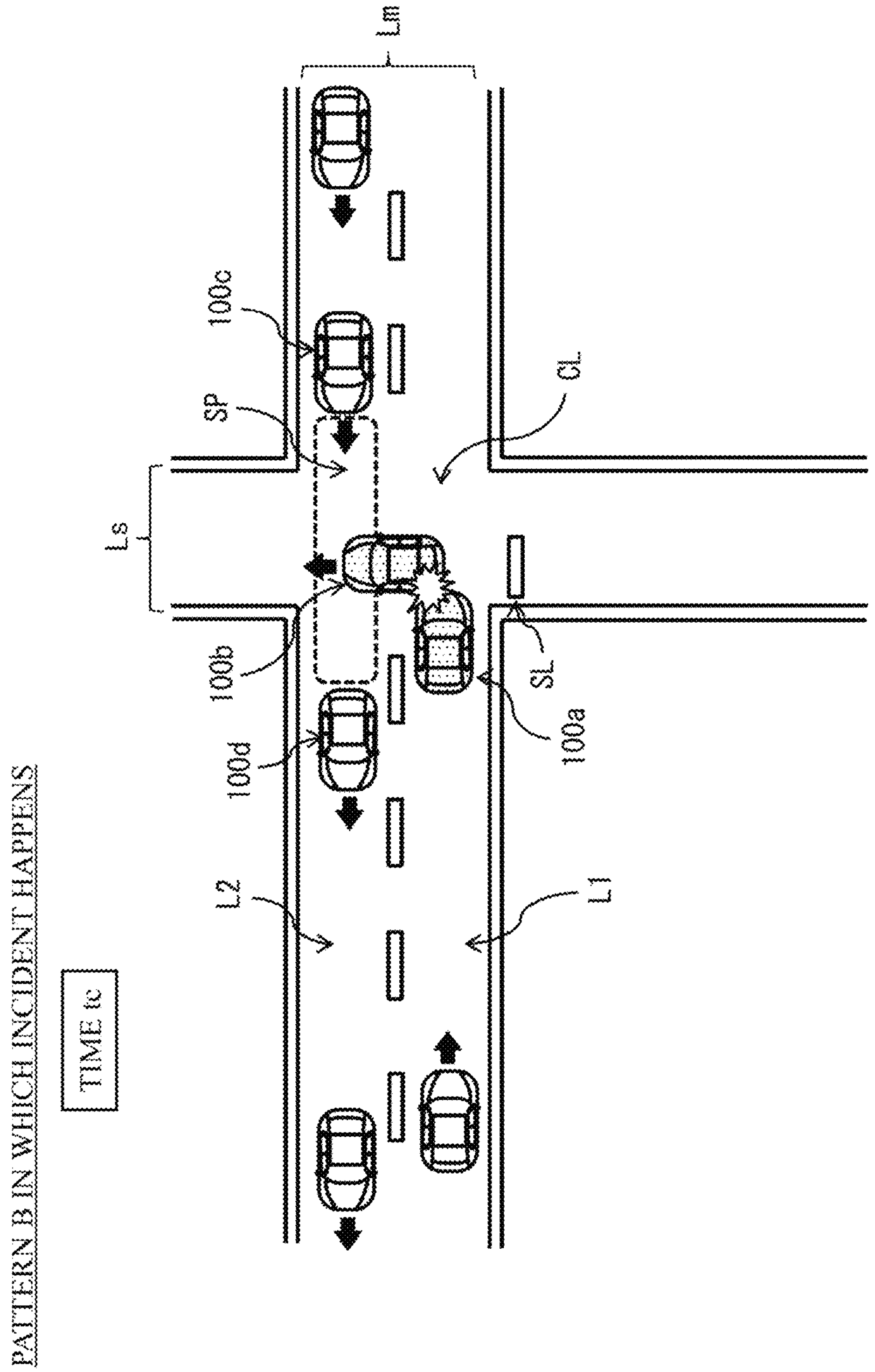
FIG. 13 is a diagram of an example of the traffic situation near the intersection.

FIGS. 11, 12, and 13 illustrate another virtual case of the traffic situation. In FIGS. 11, 12, and 13, it is assumed that the vehicle (subject vehicle) 100*a* is traveling on a road including one lane on each side. The road including one lane on each side includes the travel lane L1 on which the vehicle 100*a* is traveling, and the opposite lane L2 provided along the travel lane L1 with the centerline in between. The road including one lane on each side includes the intersection CL ahead of the vehicle 100*a*. The road including one lane on each side is the priority road Lm in relation to a road intersecting the road including one lane on each side at the intersection CL. That is, the vehicle 100*a* is traveling on the priority road Lm. Meanwhile, the road intersecting the priority road Lm at the intersection CL is the non-priority road Ls in relation to the priority road Lm. On the non-priority road Ls, the vehicle (target vehicle) 100*b* is traveling far short of the stop line SL (waiting point) (time ta in FIG. 11). No traffic lights are installed at the intersection CL.

The driver of the vehicle 100*a* is aware that the vehicle 100*a* is traveling on the priority road Lm. Accordingly, the vehicle 100*a* is going to enter the intersection CL without decelerating. At this occasion, on the non-priority road Ls, the vehicle 100*b* is traveling far short of the stop line SL (waiting point). The driver of the vehicle 100*b* intends to pass through the intersection CL just ahead or turn left at the intersection CL. The driver of the vehicle 100*b*, on the non-priority road Ls, is looking out for the timing of passing through the intersection CL or the timing of turning left at the intersection CL while allowing the vehicle 100*b* to travel. At this occasion, the driver of the vehicle 100*b* spots the space SP on the lane (opposite lane L2) for the leftward travel on the priority road Lm. The driver of the vehicle 100*b* decides to pass through the intersection CL or turn left at the intersection CL by using the space SP, and starts to allow the vehicle 100*b* to enter the intersection CL without stopping in front of the stop line SL (time tb in FIG. 12). At this occasion, the driver of the vehicle 100*b* is preoccupied with passing through the intersection CL or turning left at the intersection CL by using the space SP they have spotted, and inadvertently overlooks the presence of the vehicle 100*a*.

As time (time to spare) from the time when the driver of the vehicle 100*b* spots the space SP to the time when the driver of the vehicle 100*b* allows the vehicle 100*b* to enter the intersection CL becomes shorter, the driver of the vehicle 100*b* becomes more impatient, feeling that they have to enter the intersection CL immediately. In particular, when the vehicle 100*b* can enter the space SP without decelerating, or when the vehicle 100*b* can enter the space SP by entering the intersection CL with a small amount of deceleration, the driver of the vehicle 100*b* tends to make a hasty determination. Thus, normally, the driver of the vehicle 100*b* can recognize the presence of the vehicle 100*a*, but the impatient driver of the vehicle 100*b* inadvertently overlooks the presence of the vehicle 100*a* because of the impatience. As a result, the driver of the vehicle 100*b* allows the vehicle 100*b* to enter the intersection CL without recognizing the presence of the vehicle 100*a*. In such a traffic situation, there is high possibility of an incident of collision between the vehicle 100*a* and the vehicle 100*b* as they meet at the intersection CL (time to in FIG. 13).

Thus, the inventors of the application has thought of predicting behavior of the vehicle 100*b* by using a parameter highly correlated with the mental state of the driver of the vehicle 100*b*, such as the waiting time for the vehicle 100*b* and the time to spare for the vehicle 100*b*, as a measure to reduce a risk of collision between the vehicle 100*a* and the vehicle 100*b* in a specific traffic situation in which the vehicle 100*a* and the vehicle 100*b* are going to enter the intersection CL where the priority road Lm and the non-priority road Ls intersect. In the following, detailed description is given of a travel control system to realize that.

2. Embodiment

[Configuration]

FIG. 1 illustrates a schematic configuration example of a travel control system 1 according to an embodiment of the disclosure. As illustrated in FIG. 1, the travel control system 1 may include, for example, a travel controller 10 and a controller 200. The travel controller 10 may be mounted on each of multiple vehicles. The controller 200 may be provided in a network environment NW to which the travel controllers 10 are coupled by wireless communication. In one embodiment of the disclosure, the travel controller 10 may serve as a "driver assistance apparatus".

The controller 200 may sequentially integrate and update road map information transmitted from the travel controller 10 of each vehicle, and transmit the updated road map information to each vehicle. The controller 200 may include, for example, a road map information integrated ECU 201 and a transceiver 202.

The road map information integrated ECU 201 may integrate the road map information collected from the multiple vehicles through the transceiver 202, and sequentially update the road map information surrounding the vehicles on the road. The road map information may include, for example, a dynamic map. The road map information may include static information and quasi-static information that mainly constitute road information, and quasi-dynamic information and dynamic information that mainly constitute traffic information.

The static information constituting the road information may include, for example, information to be updated within one month, e.g., roads and structures on the roads, structures around the roads, lane information, road surface information, and permanent regulatory information. The "roads" may include, for example, positions and shapes of the roads, intersections, and attributes of the roads (e.g., national roads, prefectural roads, municipal roads, private roads, priority roads, non-priority roads, general roads, and expressways), etc. The "structures on the roads" may include, for example, traffic signs, traffic lights, convex traffic mirrors at road curves, footbridges, and the like. The "structures around the roads" may include, for example, various buildings, parks, and the like.

The quasi-static information constituting the road information may include, for example, information to be updated within one hour, e.g., traffic regulatory information by road construction, events, and the like, wide-area weather information, and traffic congestion prediction.

The quasi-dynamic information constituting the traffic information may include, for example, information to be updated within one minute, e.g., an actual congestion state and a travel regulation at the time of observation, temporary states of obstacles to travel such as a falling object or an obstacle, an actual incident state, and narrow-area weather information.

The dynamic information constituting the traffic information may include information to be updated in units of one second, e.g., information transmitted and exchanged between mobile bodies, information regarding current display of the traffic lights, information regarding pedestrians and bicycles at an intersection, and vehicle information regarding vehicles traveling on the roads. Such road map information may be maintained and updated on cycles until the next piece of information is received from each vehicle, and the updated road map information may be transmitted as appropriate to each vehicle through the transceiver 202.

The travel controller 10 may include a travel environment recognizer 11 and a locator unit 12 as units that recognize a travel environment around the vehicle. Moreover, the travel controller 10 may include a travel control unit (hereinafter, referred to as a "travel_ECU") 21, an engine control unit (hereinafter, referred to as an "E/G_ECU") 22, a power steering control unit (hereinafter, referred to as a "PS_ECU") 23, and a brake control unit (hereinafter, referred to as a "BK_ECU") 24. These control units 21 to 24 may be coupled together through an in-vehicle communication line such as a CAN (Controller Area Network), together with the travel environment recognizer 11 and the locator unit 12.

The travel_ECU 21 may control the vehicle in accordance with, for example, a driving mode. Non-limiting examples of the driving mode may include a manual driving mode and a travel control mode. The manual driving mode is a driving mode that involves steering by a driver. The manual driving mode is a driving mode that includes allowing the subject vehicle to travel in accordance with driving operations by the driver, e.g., a steering operation, an accelerator operation, and a brake operation. The travel control mode is a driving mode that includes assisting the driver in making the driving operations to enhance safety of pedestrians, vehicles, or the like around the vehicle (subject vehicle). In the travel control mode, for example, when the vehicle (subject vehicle) approaches an intersection, the travel_ECU 21 may predict behavior of a traveling vehicle or a stopped vehicle on a road intersecting at the intersection (hereinafter, referred to as a "target vehicle"). As a result of the prediction, when there is high possibility of entry of the target vehicle into the intersection, the travel_ECU 21 is configured to, for example, call for the driver's attention, alert the driver, and furthermore, make a risk avoidance control such as braking. Contents of processing in the travel control mode are described later in detail.

To output side of the E/G_ECU 22, a throttle actuator 25 may be coupled. The throttle actuator 25 may open and close a throttle valve of an electronically controlled throttle provided in a throttle body of an engine. The E/G_ECU 22 may control operation of the throttle actuator 25 by outputting a drive signal to the throttle actuator 25. The throttle actuator 25 may generate a desired engine output by causing opening and closing operation of the throttle valve based on the drive signal from the E/G_ECU 22 to adjust an intake air flow rate.

To output side of the PS_ECU 23, an electric power steering motor 26 may be coupled. The electric power steering motor 26 may apply steering torque to a steering mechanism by a rotational force of the motor. The PS_ECU 23 may control operation of the electric power steering motor 26 by outputting a drive signal to the electric power steering motor 26. In automated driving, the electric power steering motor 26 may make a lane keeping travel control and a lane change control (lane change control for an overtaking control, etc.) based on the drive signal from the PS_ECU 23. The lane keeping travel control includes maintaining the travel on the current travel lane. The lane change control includes moving the subject vehicle to an adjacent lane.

To output side of the BK_ECU 24, a brake actuator 27 may be coupled. The brake actuator 27 may adjust brake hydraulic pressure to be supplied to brake wheel cylinders provided on respective wheels. The BK_ECU 24 may control operation of the brake actuator 27 by outputting a drive signal to the brake actuator 27. The brake actuator 27 may generate braking forces for the respective wheels by the brake wheel cylinders based on the drive signal from the BK_ECU 24, to force the vehicle to decelerate.

The travel environment recognizer 11 may be fixed to, for example, the upper center of an inner front portion of the vehicle. The travel environment recognizer 11 may include an in-vehicle camera (stereo camera), an image processing unit (IPU) 11*c*, and a travel environment detector 11*d*. The in-vehicle camera may include a main camera 11*a* and a sub-camera 11*b*.

The main camera 11*a* and the sub-camera 11*b* are autonomous sensors that sense the real space around the vehicle. The main camera 11*a* and the sub-camera 11*b* may be disposed at, for example, horizontally symmetrical positions with respect to the widthwise center of the vehicle. The main camera 11*a* and the sub-camera 11*b* are configured to capture vehicle-frontward stereo images from different viewpoints.

The IPU 11*c* is configured to generate a distance image. The distance image may be obtained based on an amount of displacement between positions of a corresponding target in a pair of the vehicle-frontward stereo images obtained by imaging by the main camera 11*a* and the sub-camera 11*b*.

For example, the travel environment detector 11*d* is configured to obtain lane lines that define a road around the vehicle, based on the distance image received from the IPU 11*c*. For example, the travel environment detector 11*d* is further configured to obtain a road curvature [1/m] of the lane lines that define the right and left edges of a travel road (travel lane) on which the vehicle travels, and a width (vehicle width) between the right and left lane lines. For example, the travel environment detector 11*d* is further configured to perform predetermined pattern-matching with respect to the distance image, to detect lanes and three-dimensional objects such as the structures present around the vehicle.

Here, in the detection of three-dimensional objects in the travel environment detector 11*d*, for example, detection of the kind of a three-dimensional object, a distance to the three-dimensional object, a speed of the three-dimensional object, a relative speed of the three-dimensional object to the vehicle (subject vehicle), and the like may be performed. Non-limiting examples of the three-dimensional objects to be detected may include traffic lights, intersections, road signs, stop lines, other vehicles, pedestrians, and various buildings. For example, the travel environment detector 11*d* is configured to output information regarding the detected three-dimensional objects to the travel_ECU 21.

The locator unit 12 may estimate a position of the vehicle (vehicle position) on a road map, and include a locator calculator 13. The locator calculator 13 may estimate the vehicle position. To input side of the locator calculator 13, sensors to be involved in estimating the position of the vehicle (vehicle position) may be coupled. Non-limiting examples of such sensors may include an acceleration rate sensor 14, a vehicle speed sensor 15, a gyro sensor 16, and a GNSS receiver 17. The acceleration rate sensor 14 is configured to detect a longitudinal acceleration rate of the vehicle. The vehicle speed sensor 15 is configured to detect a speed of the vehicle. The gyro sensor 16 is configured to detect an angular speed or an angular acceleration rate of the vehicle. The GNSS receiver 17 is configured to receive positioning signals transmitted from positioning satellites. Moreover, to the locator calculator 13, a transceiver 18 may be coupled. The transceiver 18 may transmit and receive information to and from the controller 200, and transmit and receive information to and from other vehicles.

Moreover, to the locator calculator 13, a high-precision road map database 19 may be coupled. The high-precision road map database 19 may include a large-capacity storage medium such as an HDD and hold high-precision road map information (dynamic map). As with the road map information included in the road map information integrated ECU 201, the high-precision road map information may include, for example, static information and quasi-static information that mainly constitute road information, and quasi-dynamic information and dynamic information that mainly constitute traffic information.

The locator calculator 13 may include, for example, a map information acquirer 13*a*, a vehicle position estimator 13*b*, and a travel environment recognizer 13*c*.

The vehicle position estimator 13*b* is configured to acquire positional coordinates of the vehicle (subject vehicle) based on the positioning signals received by the GNSS receiver 17. Moreover, the vehicle position estimator 13*b* is configured to estimate the vehicle position on the road map by map-matching the acquired positional coordinates on route map information. The map information acquirer

13*a* is configured to acquire map information regarding a predetermined range including the vehicle (subject vehicle) from the map information held in the high-precision road map database 19 based on the positional coordinates of the vehicle (subject vehicle) acquired by the vehicle position estimator 13*b*.

In an environment in which a decrease in sensitivity of the GNSS receiver 17 inhibits the GNSS receiver 17 from receiving valid positioning signals from the positioning satellites, e.g., on travel through a tunnel, the vehicle position estimator 13*b* is configured to estimate the vehicle position on the road map by switching to autonomous navigation. The autonomous navigation includes estimating the vehicle position based on the vehicle speed detected by the vehicle speed sensor 15, the angular speed detected by the gyro sensor 16, and the longitudinal acceleration rate detected by the acceleration rate sensor 14.

When the vehicle position estimator 13*b* estimates the position of the vehicle (vehicle position) on the road map based on, for example, the positioning signals received by the GNSS receiver 17 or the information detected by the gyro sensor 16 as described above, the vehicle position estimator 13*b* is configured to determine, for example, the kind of the travel road on which the vehicle (subject vehicle) is traveling, based on the estimated vehicle position on the road map.

The travel environment recognizer 13*c* is configured to update the road map information held in the high-precision road map database 19 to the latest state by using the road map information acquired by external communication (road-to-vehicle communication and vehicle-to-vehicle communication) through the transceiver 18. This information update may be made with respect to not only the static information but also the quasi-static information, the quasi-dynamic information, and the dynamic information. Thus, the road map information includes road information and traffic information acquired by the communication with outside the vehicle, and information regarding moving bodies such as vehicles traveling on the road is updated in substantially real time.

The travel environment recognizer 13*c* is configured to verify the road map information based on travel environment information recognized by the travel environment recognizer 11, and update the road map information held in the high-precision road map database 19 to the latest state. This information update may be made with respect to not only the static information but also the quasi-static information, the quasi-dynamic information, and the dynamic information. Thus, information regarding moving bodies such as vehicles traveling on the road recognized by the travel environment recognizer 11 is updated in real time.

The road map information thus updated may be transmitted to the controller 200, surrounding vehicles around the vehicle (subject vehicle), and the like by the road-to-vehicle communication and the vehicle-to-vehicle communication through the transceiver 18. Furthermore, the travel environment recognizer 13*c* is configured to output, to the travel_ECU 21, the map information regarding the predetermined range including the vehicle position estimated by the vehicle position estimator 13*b*, within the updated road map information, together with the vehicle position (vehicle position information).

Next, the travel_ECU 21 is described in detail.

Figure 2:
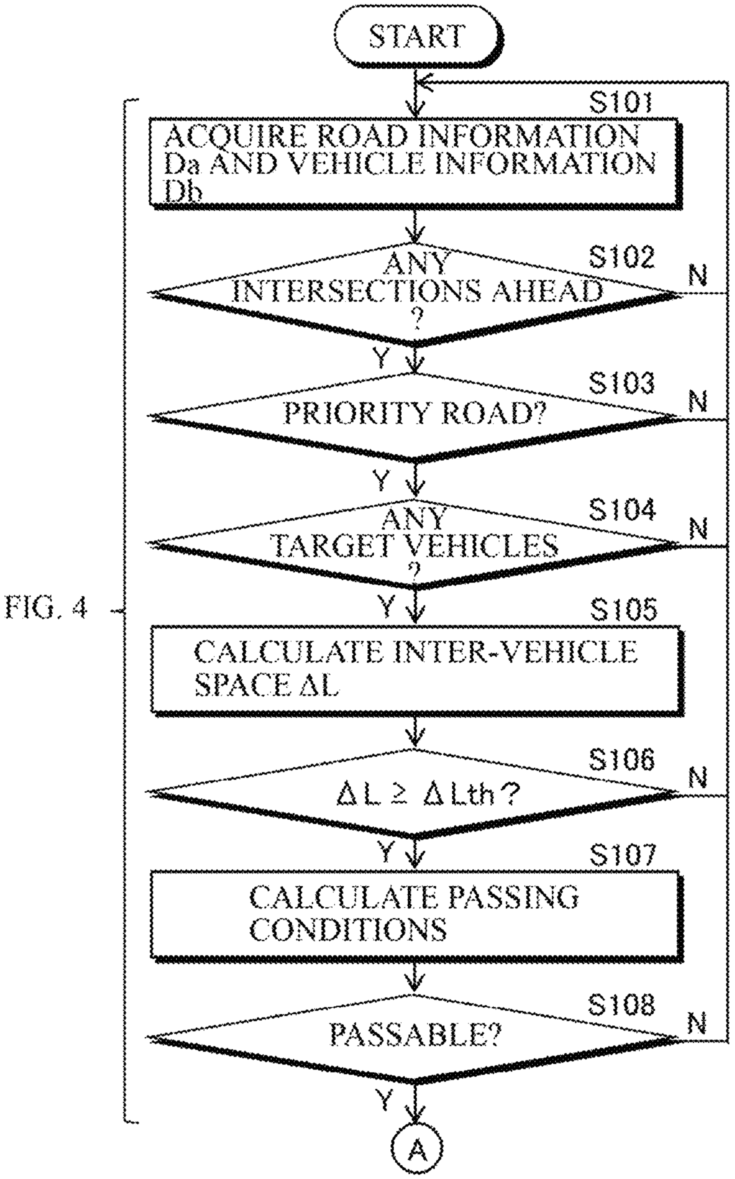
FIG. 2 is a flowchart of an example of a driver assistance procedure in the travel control system in FIG. 1.
Figure 3:
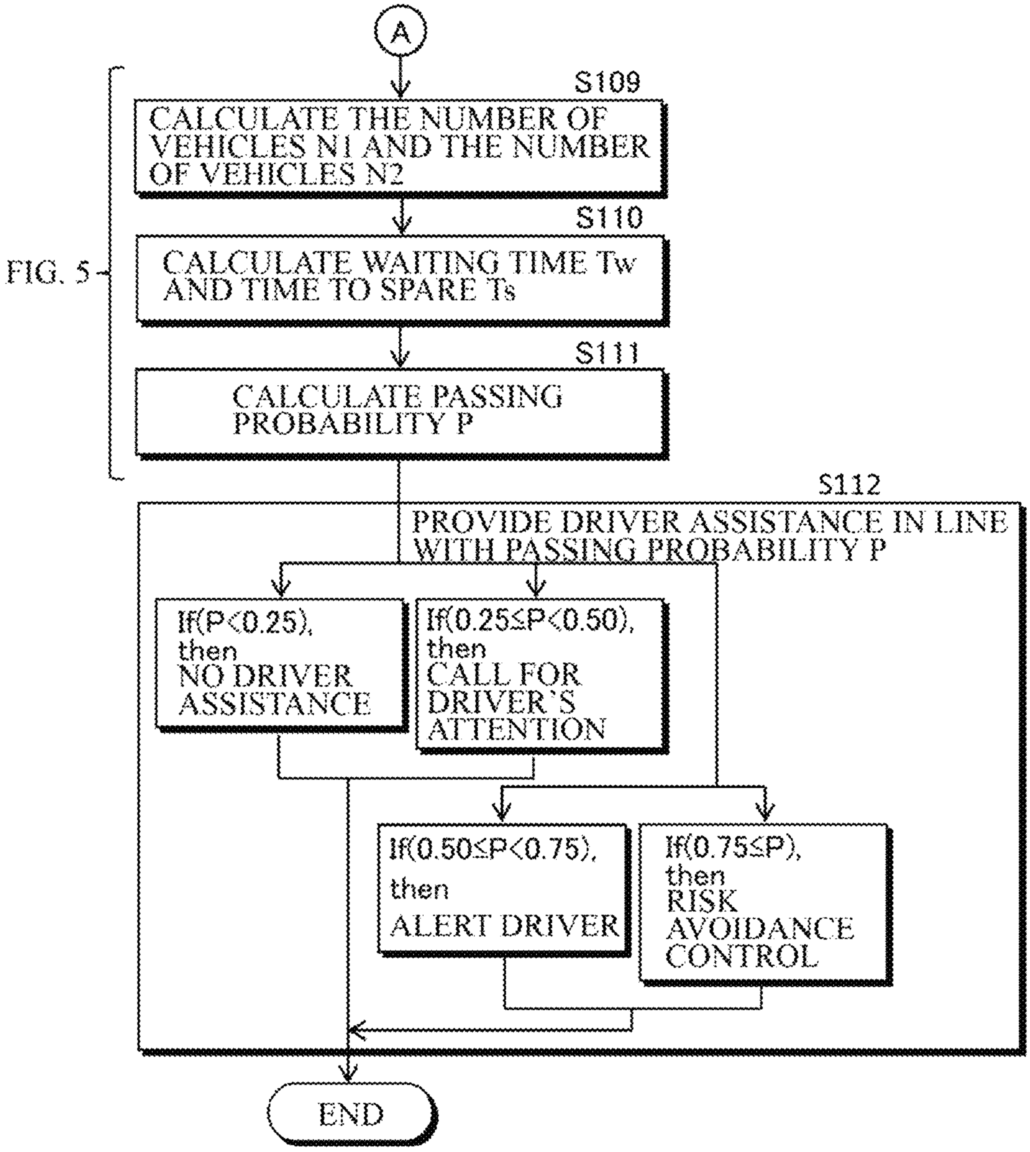
FIG. 3 is a flowchart of an example of the driver assistance procedure subsequent to FIG. 2.
Figure 4:
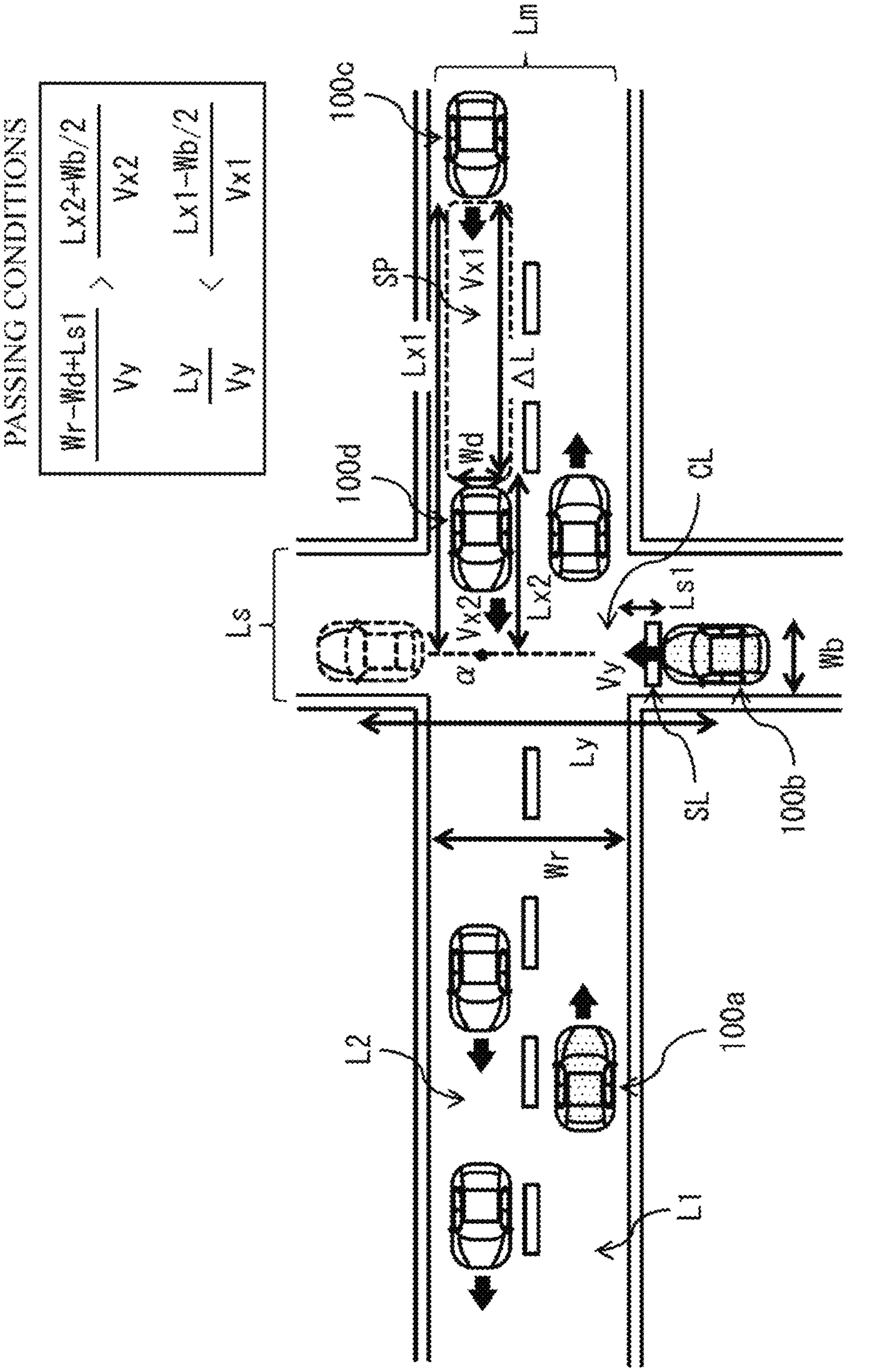
FIG. 4 is a diagram of an example of passing conditions at an intersection.
Figure 5:
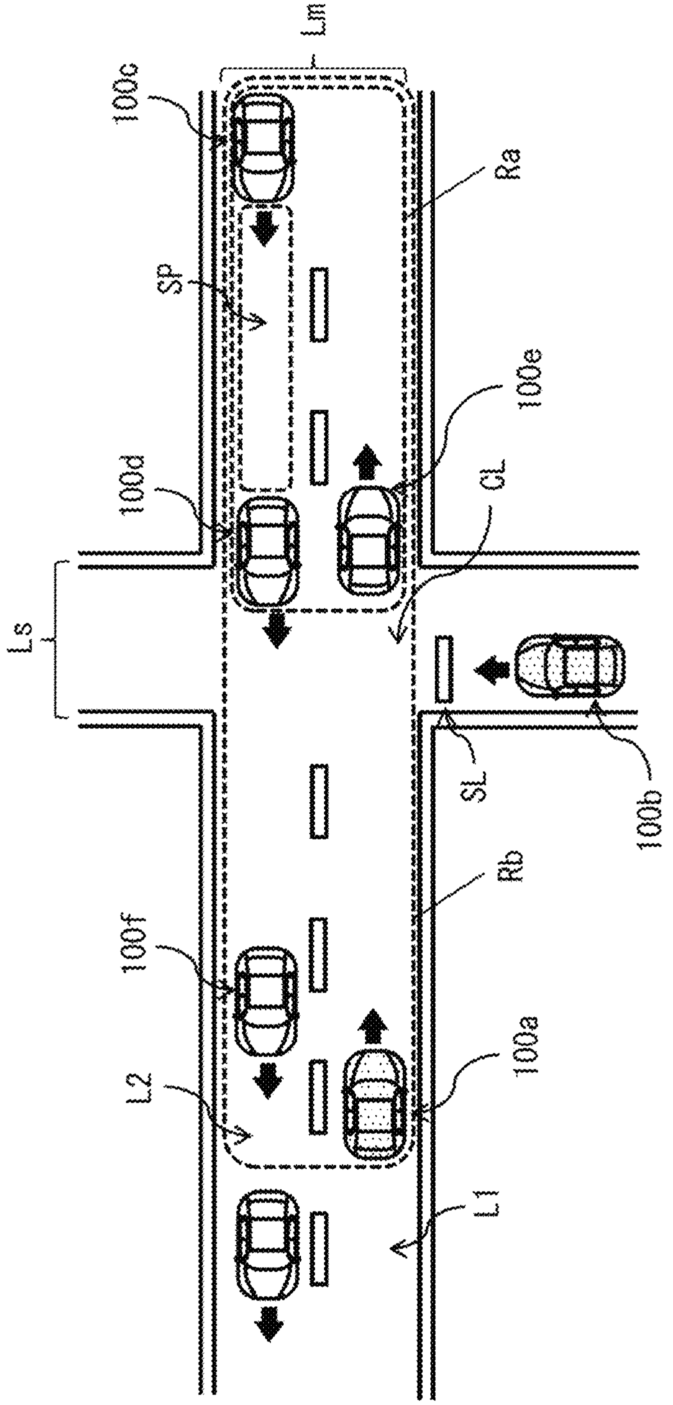
FIG. 5 is a diagram of an example of a count target region of the number of vehicles near the intersection.

FIGS. 2 and 3 illustrate an example of a driver assistance procedure in the travel control system 1. FIG. 4 illustrates an example of a traffic situation in steps S101 to S108 in FIG. 2. FIG. 5 illustrates an example of two regions (nearby region Ra and evaluation target region Rb) defined for calculation of passing probability P in steps S109 to S111 in FIG. 3. FIG. 4 illustrates conditions (passing conditions) under which the vehicle 100*b* (target vehicle) passes through a space SP. The passing probability P indicates possibility of entry of the vehicle 100*b* into the space SP.

In FIG. 4, let us assume that the vehicle (subject vehicle) 100*a* is traveling on a road including one lane on each side. In one embodiment of the disclosure, the vehicle 100*a* may serve as a "first vehicle". The road including one lane on each side includes a travel lane L1 on which the vehicle 100*a* is traveling, and an opposite lane L2 provided along the travel lane L1 with a centerline in between. The road including one lane on each side includes an intersection CL ahead of the vehicle 100*a*. The road including one lane on each side is a priority road Lm in relation to a road intersecting the road including one lane on each side at the intersection CL. That is, the vehicle 100*a* is traveling on the priority road Lm.

Meanwhile, the road intersecting the priority road Lm at the intersection CL is a non-priority road Ls in relation to the priority road Lm. On the non-priority road Ls, the vehicle (target vehicle) 100*b* is stopped in front of the stop line SL (waiting point) or traveling toward the intersection CL. In an embodiment of the disclosure, the vehicle 100*b* may serve as a "prediction target vehicle". No traffic lights are installed at the intersection CL.

The driver of the vehicle 100*a* is aware that the vehicle 100*a* is traveling on the priority road Lm. Accordingly, the vehicle 100*a* is going to enter the intersection CL without decelerating. At this occasion, on the non-priority road Ls, the vehicle 100*b* is stopped in front of the stop line SL (waiting point) or traveling toward the intersection CL. The driver of the vehicle 100*b* intends to pass through the intersection CL or turn left at the intersection CL. The driver of the vehicle 100*b*, on the non-priority road Ls, is looking out for the timing of passing through the intersection CL or the timing of turning left at the intersection CL while the vehicle 100*b* is stopped in front of the stop line SL (waiting point) or traveling toward the intersection CL. At this occasion, the driver of the vehicle 100*b* spots the large space SP between the vehicle 100*c* and the vehicle 100*d* on the lane (opposite lane L2) for the leftward travel on the priority road Lm. The driver of the vehicle 100*b* decides to pass through the intersection CL or turn left at the intersection CL by using this space SP, and allows the vehicle 100*b* to enter the intersection CL. However, the driver of the vehicle 100*b* is preoccupied with passing through the intersection CL or turning left at the intersection CL by using the space SP they have spotted, and inadvertently overlooks the presence of the vehicle 100*a*.

Here, let us assume that the vehicle 100*b* is stopped in front of the stop line SL. At this occasion, as the stop time (waiting time) in front of the stop line SL becomes longer, the driver of the vehicle 100*b* becomes more irritated because they are unable to start the vehicle. Thus, normally, the driver of the vehicle 100*b* can recognize the presence of the vehicle 100*a*, but the irritated driver of the vehicle 100*b* inadvertently overlooks the presence of the vehicle 100*a* because of the irritation. As a result, the driver of the vehicle 100*b* starts the vehicle 100*b* without recognizing the presence of the vehicle 100*a*. In such a traffic situation, there is high possibility of an incident of collision between the vehicle 100*a* and the vehicle 100*b* as they meet at the intersection CL.

Moreover, let us assume that the vehicle 100*b* is traveling short of the stop line SL. At this occasion, as the time (time to spare) from the time when the driver of the vehicle 100*b* spots the space SP to the time when the driver of the vehicle 100*b* allows the vehicle 100*b* to enter the intersection CL becomes shorter, the driver of the vehicle 100*b* becomes more impatient, feeling that they have to enter the intersection CL immediately. In particular, when the vehicle 100*b* can enter the space SP without decelerating, or when the vehicle 100*b* can enter the space SP by entering the intersection CL with a small amount of deceleration, the driver of the vehicle 100*b* tends to make a hasty determination. Thus, normally, the driver of the vehicle 100*b* can recognize the presence of the vehicle 100*a*, but the impatient driver of the vehicle 100*b* inadvertently overlooks the presence of the vehicle 100*a* because of the impatience and the hasty determination. As a result, the driver of the vehicle 100*b* allows the vehicle 100*b* to enter the intersection CL without recognizing the presence of the vehicle 100*a*. In such a traffic situation, there is high possibility of an incident of collision between the vehicle 100*a* and the vehicle 100*b* as they meet at the intersection CL.

Thus, the travel_ECU 21 is configured to make calculation in consideration of such a matter. In one example, the travel_ECU 21 is configured to determine whether it is the specific traffic situation in which the vehicle 100*a* and the vehicle 100*b* are going to enter the intersection CL where the priority road Lm and the non-priority road Ls intersect. Moreover, after determining that it is the specific traffic situation, the travel_ECU 21 is configured to predict the possibility of the entry of the vehicle 100*b* into the space SP (passing probability P) based on presence of the space SP (entry space) available for the entry of the vehicle 100*b* and a result of calculation of waiting time Tw or time to spare Ts of the vehicle 100*b*.

(Space SP)

The space SP refers to a space formed by any two adjacent vehicles on a common lane (e.g., the opposite lane L2). The "space SP available for the entry of the vehicle 100*b* (entry space)" refers to a space having a width or a length theoretically large enough for the vehicle 100*b* to enter, when the vehicle 100*b* is stopped in front of the stop line SL or traveling toward the intersection CL. The "entry space" needs to be present at least within a range recognizable by the driver of the vehicle 100*b*. Accordingly, the "entry space" needs to be present, for example, in a range of a radius of about 50 m with the vehicle 100*b* as a center.

For example, the travel_ECU 21 is configured to determine presence or absence of the space SP satisfying the following passing conditions (1) and (2), among one or more spaces SP each formed by any two adjacent vehicles on the opposite lane L2 of the priority road Lm. When the passing conditions (1) and (2) are represented by mathematical expressions, the mathematical expressions are as given in the following paragraph. As a result, when the space SP is present that satisfies the following mathematical expressions of the passing conditions, the travel_ECU 21 is configured to recognize the relevant space SP as the space SP (entry space) available for the entry of the vehicle 100*b*.

(1) The vehicle 100*b* does not come into contact with the vehicle 100*d*, and after the vehicle 100*d* passes through the intersection CL, the vehicle 100*b* passes through the space SP or enter the space SP.

(2) The vehicle 100*b* does not come into contact with the vehicle 100*c*, and after the vehicle 100*b* passes through the space SP or enters the space SP, the vehicle 100*c* passes through the intersection CL.

(Passing Conditions)

$$(Wr/2+Ls1)/Vy > (Lx2+Wb/2)/Vx2$$

$$Ly/Vy < (Lx1-Wb/2)/Vx1$$

Vx1: Speed of the vehicle 100*c* [m/s]
Vx2: Speed of the vehicle 100*d* [m/s]
Vy: Speed of the vehicle 100*b* [m/s]
Lx1: Distance from a rear end of the space SP to a point (meeting point a) where the vehicle 100*c* and the vehicle 100*b* meet at the intersection CL [m]
Lx2: Distance from a front end of the space SP to the point (meeting point α) where the vehicle 100*c* and the vehicle 100*b* meet at the intersection CL [m]
Ly: Length [m] obtained by adding a width [m] of the priority road Lm at the intersection CL to a total length [m] of the vehicle 100*b*
Wr: Width of priority road Lm [m]
Wb: Half (½) of a width of the non-priority road Ls [m]
Wd: Half (½) of the width of the priority road Lm [m]
Ls1: Distance from the stop line SL to the priority road Lm in the intersection CL [m]
(Wr/2+Ls1)/Vy: Time it takes for the vehicle 100*b* to reach the opposite lane L2 in the intersection CL from the stop line SL [s]
(Lx2+Wb/2)/Vx2: Time it takes for the vehicle 100*d* to pass through the intersection CL from the current position [s]
Ly/Vy: Time it takes for the vehicle 100*b* to move from a position of the stop line SL to a position at which the vehicle 100*b* has passed through the intersection CL (position of the vehicle indicated by the broken lines in FIG. 4) [s]
(Lx1−Wb/2)/Vx1: Time it takes for the vehicle 100*c* to reach the opposite lane L2 in the intersection CL from the current position [s]

It is to be noted that non-limiting examples of the traffic situation of "absence of the entry space" are as follows.

When the space SP is absent within the range recognizable by the driver of the vehicle 100*b*, within the priority road Lm (e.g., within the range of the radius of about 50 m with the vehicle 100*b* as the center)

The travel_ECU 21 is configured to estimate whether the traffic situation ahead of the vehicle 100*a* is such a traffic condition, based on, for example, the data obtained from the sensors of the vehicle 100*a* (for example, the travel environment recognizer 11), data obtained from a road surface sensor by the road-to-vehicle communication by the transceiver 18, or data obtained from random vehicles by the vehicle-to-vehicle communication by the transceiver 18. When these pieces of data includes, for example, data indicating that multiple vehicles are traveling seamlessly on the opposite lane L2, the travel_ECU 21 is configured to determine that the traffic situation ahead of the vehicle 100*a* is the traffic situation as described above.

(Waiting Time Tw)

The waiting time Tw indicates time during which the vehicle 100*b* is stopped in front of the stop line SL. The time refers to time (predicted time) predicted to be spent by the vehicle 100*b* stopped in front of the stop line SL until the vehicle 100*b* starts at the stop line SL, or actual measured time having predetermined correlation with the predicted time.

Start timing of the predicted time and the actual measured time may include, for example, various kinds of timing as described below. The start timing of the predicted time and the actual measured time may be, for example, timing at which the vehicle 100*b* stops in front of the stop line SL, or timing at which measurement of the predicted time and the actual measured time is started when the vehicle 100*b* is stopped in front of the stop line SL. The start timing of the predicted time and the actual measured time may be, for example, timing at which the "entry space" is detected when the vehicle 100*b* is stopped in front of the stop line SL. The start timing of the predicted time and the actual measured time may be, for example, timing at which the vehicle 100*b* is detected to stop in front of the stop line SL, or timing at which the vehicle 100*b* stopped in front of the stop line SL is detected.

End timing of the actual measured time may be, for example, timing at which calculation of the waiting time Tw is started in the travel_ECU 21 (timing at which step S110 described later is started). The timing at which the travel_ECU 21 starts the calculation of the waiting time Tw is timing earlier, by a predetermined time, than the timing at which the vehicle 100*b* actually starts at the stop line SL. The end timing of the actual measured time is not limited to the timing at which step S110 described later is started.

The travel_ECU 21 is configured to calculate the waiting time Tw (predicted time or actual measured time) based on, for example, the data obtained from the sensors of the vehicle 100*a* (for example, the travel environment recognizer 11), the data obtained from the road surface sensor by the road-to-vehicle communication by the transceiver 18, or the data obtained from random vehicles by the vehicle-to-vehicle communication by the transceiver 18.

(Time to Spare Ts)

The time to spare Ts refers to time to spare until the entry of the vehicle 100*b* into the "entry space". The time to spare Ts is, for example, a difference between the time at which the vehicle 100*b* is predicted to reach the "entry space" and the current time. The time to spare Ts may be, for example, time having predetermined correlation with the difference between the time at which the vehicle 100*b* is predicted to reach the "entry space" and the current time. The time to spare Ts may be, for example, time having predetermined correlation with a difference between the time at which the vehicle 100*b* is predicted to reach the stop line SL and the current time.

The travel_ECU 21 is configured to calculate the time to spare Ts based on, for example, the data obtained from the sensors of the vehicle 100*a* (for example, the travel environment recognizer 11), the data obtained from the road surface sensor by the road-to-vehicle communication by the transceiver 18, or the data obtained from random vehicles by the vehicle-to-vehicle communication by the transceiver 18.

(Passing Probability P)

The passing probability P refers to the possibility of the entry of the vehicle 100*b* into the space SP. It is possible to derive the passing probability P by, for example, the following Expression (1) or Expression (2). Expression (1) is an expression to derive the passing probability P when the vehicle 100*b* is stopped in front of the stop line SL. Expression (2) is an expression to derive the passing probability P when the vehicle 100*b* is traveling on the non-priority road Ls.

$$P = \exp(\alpha \times (N1 - N2)/N2) \times \exp(-\beta/Tw) \quad (1)$$

$$P = \exp(\alpha \times (N1 - N2)/N2) \times \exp(-\gamma Ts) \quad (2)$$

α, β, and γ: positive constant

N1: The number of vehicles in the nearby region Ra (the partial number of cognitive loads)

N2: The number of vehicles in the evaluation target region Rb (the total number of cognitive loads)

FIG. 5 illustrates an example of a count target region of the number of vehicles near the intersection CL. In FIG. 5, as the count target region, the nearby region Ra and the evaluation target region Rb are illustrated as examples. The nearby region Ra is a region, within the priority road Lm, near the space SP (entry space) available for the entry of the vehicle 100*b*. In FIG. 5, the nearby region Ra includes two vehicles (for example, vehicles 100*c* and 100*d*) constituting the entry space, and a vehicle (for example, vehicle 100*e*) traveling in a region between the entry space and the vehicle 100*b* within the lane (travel lane L1) between the entry space and the vehicle 100*b*. Accordingly, in FIG. 5, the number of the vehicles N1 is three. The evaluation target region Rb is a region ahead of the vehicle 100*a* within the priority road Lm and includes the vehicle 100*a* and the nearby region Ra. In FIG. 5, the evaluation target region Rb includes the vehicles 100*c* and 100*d*, the vehicle 100*e*, the vehicle 100*a*, and a vehicle 100*f* traveling beside the vehicle 100*a*. Accordingly, in FIG. 5, the number of the vehicles N2 is five.

The travel_ECU 21 is configured to calculate the passing probability P based on, for example, the data obtained from the sensors of the vehicle 100*a* (for example, the travel environment recognizer 11), the data obtained from the road surface sensor by the road-to-vehicle communication by the transceiver 18, or the data obtained from random vehicles by the vehicle-to-vehicle communication by the transceiver 18. Calculation timing of the number of the vehicles N1 and the number of the vehicles N2 may be, for example, timing at which the presence of the space SP (entry space) available for the entry of the vehicle 100*b* has been determined, that is, timing at which step S108 described later is performed.

(Driver Assistance Procedure)

Description now moves on to the driver assistance procedure in the travel control system 1 with reference to FIGS. 2 and 3. First, the stereo camera provided in the vehicle 100*a* may capture the frontward images of the vehicle 100*a*, and output the stereo images thus obtained, to the IPU 11*c*. The IPU 11*c* may generate the distance image based on the stereo images acquired by the stereo camera, and output the distance image to the travel environment detector 11*d*. The travel environment detector 11*d* may perform the predetermined pattern-matching or the like with respect to the distance image generated by the IPU 11*c*, and detect the priority road Lm, the travel lane L1, the opposite lane L2, the non-priority road Ls, the intersection CL, the vehicles on the priority road Lm (for example, the vehicles 100*a*, and 100*c* to 100*f*), and the vehicle on the non-priority road Ls (for example, the vehicle 100*b*).

Thereafter, the travel environment recognizer 13*c* may detect the priority road Lm, the travel lane L1, the opposite lane L2, the non-priority road Ls, the intersection CL, the vehicles on the priority road Lm (for example, the vehicles 100*a*, and 100*c* to 100*f*), and the vehicle on the non-priority road Ls (for example, the vehicle 100*b*) by using the road map information acquired by the external communication. Here, it is assumed that the road map information acquired by the external communication includes information regarding the vehicles on the priority road Lm (for example, the vehicles 100*a*, and 100*c* to 100*f*) and information regarding the vehicle on the non-priority road Ls (for example, the vehicle 100*b*). At this occasion, it is possible for the travel environment recognizer 13$c$ to detect the vehicles on the priority road Lm (for example, the vehicles 100$a$, and 100$c$ to 100$f$) and the vehicle on the non-priority road Ls (for example, the vehicle 100$b$) by using the road map information acquired by the external communication.

The vehicle position estimator 13$b$ may acquire the positional coordinates of the vehicle 100$a$ based on the positioning signals received by the GNSS receiver 17. The vehicle position estimator 13$b$ may further acquire the vehicle speed (the speed of the vehicle 100$a$) detected by the vehicle speed sensor 15.

Thereafter, the travel_ECU 21 may acquire road information Da and vehicle information Db based on various kinds of the information obtained from the travel environment detector 11$d$, the vehicle position estimator 13$b$, and the travel environment recognizer 13$c$ (step S101). Here, the road information Da may include information regarding the priority road Lm, the travel lane L1, the opposite lane L2, the non-priority road Ls, and the intersection CL detected by the travel environment detector 11$d$ or the travel environment recognizer 13$c$. The vehicle information Db may include information regarding the speed (vehicle speed) of the vehicle 100$a$ acquired from the vehicle position estimator 13$b$ and information regarding the vehicles on the priority road Lm (for example, the vehicles 100$a$, and 100$c$ to 100$f$) acquired from the travel environment detector 11$d$ or the travel environment recognizer 13$c$, and the vehicle on the non-priority road Ls (for example, the vehicle 100$b$).

Thereafter, the travel_ECU 21 may determine presence or absence of any intersections CL ahead of the vehicle 100$a$ (step S102). When the information regarding the intersection CL is included in the road information Da (step S102; Y), the travel_ECU 21 may determine whether the lane (travel lane L1) on which the vehicle 100$a$ is traveling is the priority road Lm (step S103). When the information regarding the priority road Lm is included in the road information Da (step S103; Y), the travel_ECU 21 may determine presence or absence of any vehicles (target vehicles) 100$b$ traveling on the non-priority road Ls (step S104). When the information regarding the vehicle 100$b$ is included in the vehicle information Db (step S104; Y), the travel_ECU 21 may calculate the inter-vehicle spaces ΔL formed by the vehicles traveling on the opposite lane L2 of the priority road Lm (step S105). When any one of the calculated inter-vehicle spaces ΔL is equal to or larger than a predetermined threshold value ΔLth (step S106: Y), the travel_ECU 21 may recognize the space having the inter-vehicle space ΔL equal to or larger than the threshold value ΔLth as the space SP mentioned above.

Thereafter, the travel_ECU 21 may calculate the passing conditions for the space SP (step S107). When the space SP satisfies the passing conditions (step S108; Y), the travel_ECU 21 may calculate the number of the vehicles N1, the number of the vehicles N2, the waiting time Tw or the time to spare Ts, and the passing probability P (steps S109, S110, and S111).

In each step described above, the travel_ECU 21 may perform step S101 when any one of the following applies.

When no information regarding the intersection CL is included in the road information Da (step S102; N)

When no information regarding the priority road Lm is included in the road information Da (step S103; N)

When no information regarding the vehicle 100$b$ is included in the vehicle information Db (step S104; N)

When the inter-vehicle spaces ΔL are smaller than the threshold value ΔLth (step S106; N)

When the space SP does not satisfy the passing conditions (step S108; N)

Thereafter, the travel_ECU 21 may provide driver assistance in accordance with the passing probability P (step S112). However, it is assumed that $\alpha=1$ and $\beta=\gamma=0.4$. For example, when $P<0.25$ (N2=3, N1=2, 1/Tw or Ts=2.6), the travel_ECU 21 may provide no driver assistance.

For example, when $0.25\leq P<0.50$ (N2=6, N1=5, 1/Tw or Ts=1.3), the travel_ECU 21 may call for attention of the driver of the vehicle 100$a$. The travel_ECU 21 may output, for example, a video signal on which a form image with a color (for example, yellow) indicating the presence of the vehicle 100$b$ on the non-priority road Ls is superimposed, to a head-up display that displays a video on a front windshield. This makes it possible for the driver of the vehicle 100$a$ to recognize the presence of the vehicle 100$b$ on the non-priority road Ls by the video displayed on the front windshield, and, for example, pass through the intersection CL while decelerating.

For example, when $0.50\leq P<0.75$ (N2=10, N1=8, 1/Tw or Ts=0.2), the travel_ECU 21 may alert the driver of the vehicle 100$a$. The travel_ECU 21 may output, for example, a video signal on which a form image with a color (for example, red) indicating the presence of the vehicle 100$b$ on the non-priority road Ls is superimposed, to the head-up display that displays a video on the front windshield. The travel_ECU 21 may output, for example, an audio signal that produces an intermittent sound, to a speaker. Thus, the driver of the vehicle 100$a$ recognizes the presence of the vehicle 100$b$ on the non-priority road Ls by the image displayed on the front windshield, and further recognizes a risk of a rush-out of the vehicle 100$b$ on the non-priority road Ls, by the intermittent sound from the speaker. As a result, it is possible for the driver of the vehicle 100$a$ to, for example, pass through the intersection CL slowly.

For example, when $0.75\leq P$ (N2=15, N1=12, 1/Tw or Ts=0.1), the travel_ECU 21 may make the risk avoidance control such as braking with respect to the vehicle 100$a$. The travel_ECU 21 may make predetermined braking for risk avoidance at a stage where, for example, the collision between the vehicle 100$a$ and the vehicle 100$b$ is going to happen within 3 seconds or less. Hence, it is possible to avoid the collision between the vehicle 100$a$ and the vehicle 100$b$.

[Effects]

Next, effects of the travel control system 1 according to the embodiment of the disclosure are described.

In the embodiment, the data is acquired that indicates that the vehicle 100$b$ is present, that multiple vehicles are present on one or more lanes ahead of the vehicle 100$a$ (travel lane L1 and opposite lane L2), and that the space SP (entry space) available for the entry of the vehicle 100$b$ is present, among one or more spaces each formed by any adjacent two vehicles on a common lane (opposite lane L2) out of the one or more lanes ahead of the vehicle 100$a$ (travel lane L1 and opposite lane L2). When the vehicle 100$b$ is waiting in front of the stop line SL, the waiting time Tw for the vehicle 100$b$ is estimated based on the acquired data. When the vehicle 100$b$ is traveling toward the stop line SL, the time to spare Ts until the entry of the vehicle 100$b$ into the entry space is estimated based on the acquired data. Furthermore, based on the waiting time Tw or the time to spare Ts, the possibility of the entry of the vehicle 100$b$ into the entry space (passing probability P) is predicted. This makes it possible to predict the possibility that the vehicle 100$b$ passes through the intersection CL under the influence of the mental state of the driver of the vehicle 100$b$. As a result, it is possible to call for the driver's attention, alert the driver, make a braking control, and the like, making it possible to avoid the collision between the vehicle 100*a* and the vehicle 100*b*.

In the embodiment, the possibility of the entry of the vehicle 100*b* into the entry space (passing probability P) may be predicted based on the number of the vehicles N1, the number of the vehicles N2, and the waiting time Tw or the time to spare Ts. This makes it possible to predict the possibility that the vehicle 100*b* passes through the intersection CL under the influence of the mental state of the driver of the vehicle 100*b*. As a result, it is possible to call for the driver's attention, alert the driver, make the braking control, and the like, making it possible to avoid the collision between the vehicle 100*a* and the vehicle 100*b*.

In the embodiment, when the road information Da and the vehicle information Db are acquired from the sensors provided in the vehicle 100*a*, it is possible to predict the possibility of the entry of the vehicle 100*b* into the entry space (passing probability P) even when it is difficult for the vehicle 100*a* to communicate with the network environment NW.

In the embodiment, when the road information Da and the vehicle information Db are acquired from the sensors provided in the vehicle 100*a* and the network environment NW, it is possible to predict the possibility of the entry of the vehicle 100*b* into the entry space (passing probability P) more accurately than the case where the road information Da and the vehicle information Db are generated only by the sensors provided in the vehicle 100*a*.

3. Modification Examples

Although some example embodiments of the disclosure have been described in the foregoing by way of example with reference to the accompanying drawings, the disclosure is by no means limited to the embodiments described above. It should be appreciated that modifications and alterations may be made by persons skilled in the art without departing from the scope as defined by the appended claims. The disclosure is intended to include such modifications and alterations in so far as they fall within the scope of the appended claims or the equivalents thereof.

Modification Example 3-1

Figure 6:
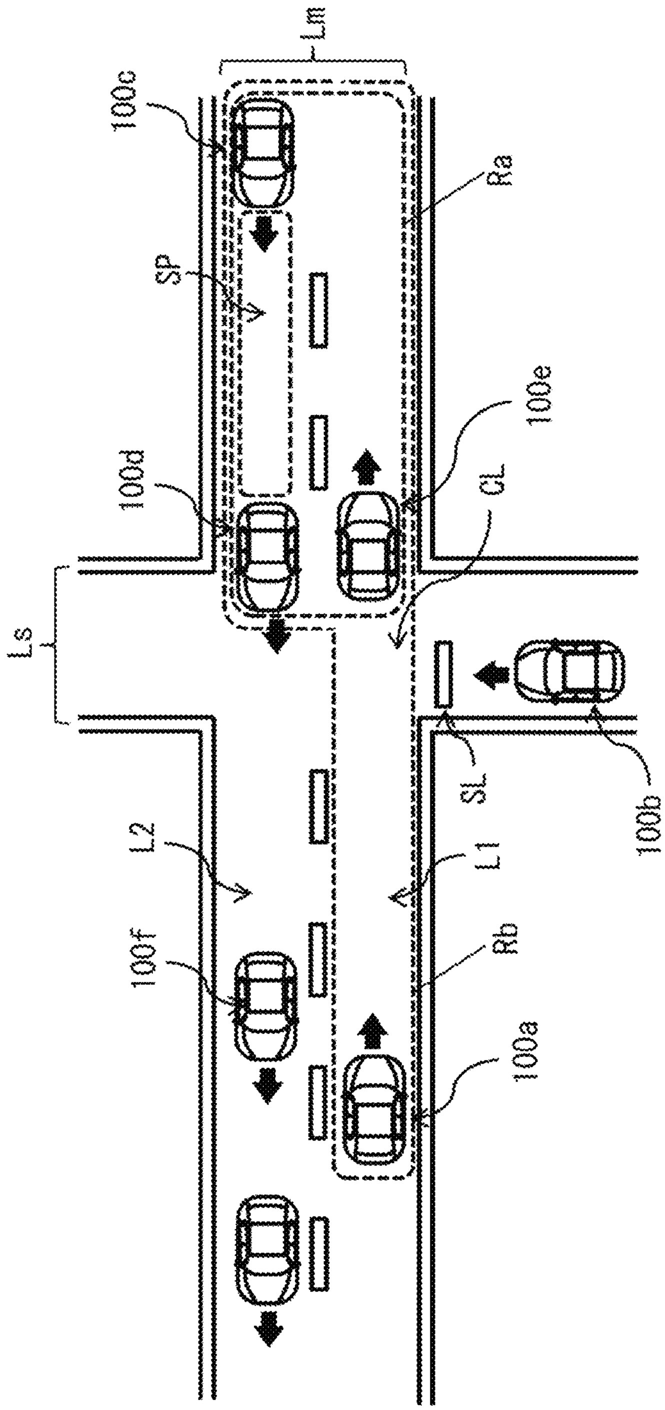
FIG. 6 is a diagram of a modification example of the count target region of the number of the vehicles near the intersection.

In the forgoing embodiment, the evaluation target region Rb may be, for example, as illustrated in FIG. 6, a region including the nearby region Ra and a region extending from the position of the vehicle 100*a* to the entry space within the lane (travel lane L1) on which the vehicle 100*a* travels. In such a case, it is possible to exclude, from the number of the vehicles N2, the number of vehicles traveling in a region having a relatively small influence on the entry of the vehicle 100*b* into the entry space (a region between the vehicle 100*a* and the entry space within the opposite lane L2). As a result, it is possible to calculate the passing probability P more accurately.

Modification Example 3-2

Figure 7:
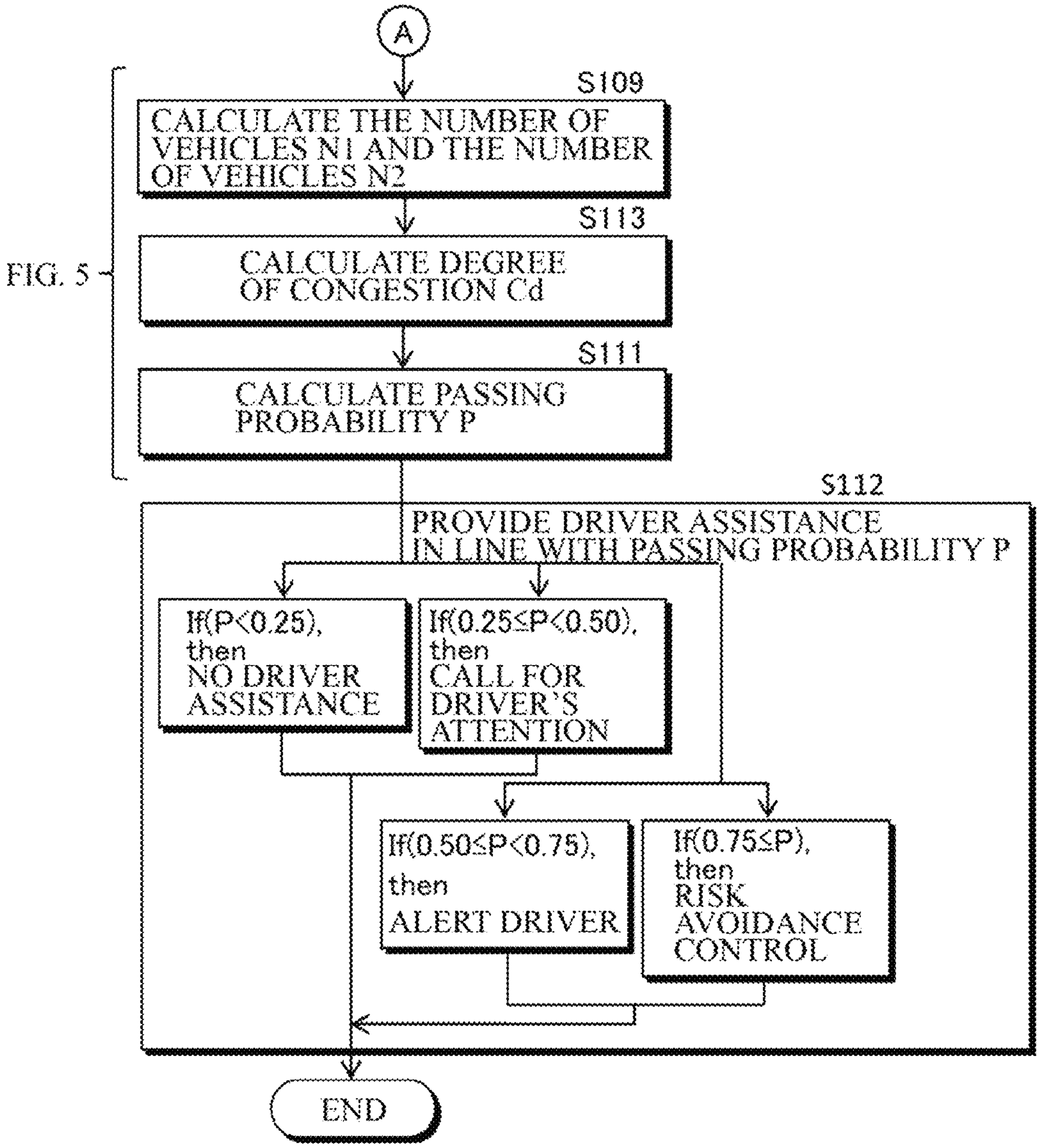
FIG. 7 is a flowchart of a modification example of the driver assistance procedure subsequent to FIG. 2.

In the forgoing embodiment and the modification examples thereof, for example, as illustrated in step S113 in FIG. 7, the travel_ECU 21 may be configured to predict the possibility of the entry of the vehicle 100*b* into the entry space (passing probability P) based on a degree of congestion Cd of the nearby region Ra and the evaluation target region Rb, instead of the waiting time Tw and the time to spare Ts.

Modification Example 3-3

In the forgoing embodiment, the disclosure is applied to the driver assistance at the intersection CL where the priority road Lm and the non-priority road Ls intersect. However, in the forgoing embodiment and the modification examples thereof, the disclosure may be applied to, for example, the driver assistance at a merging point where the non-priority road Ls merges with the priority road Lm. In such a case, as with the forgoing embodiment and the modification examples thereof, it is possible to predict possibility of merging of the vehicle 100*b* under the influence of the mental state of the driver of the vehicle 100*b*.

Modification Example 3-4

In the forgoing embodiment and the modification examples thereof, when it is difficult for the vehicle 100*a* to communicate with the network environment NW, the travel_ECU 21 may acquire the road information Da and the vehicle information Db based on, for example, various kinds of data regarding a sensor detection region SR obtained from the various sensors mounted on the vehicle 100*a*. Here, the road information Da may include the information regarding the priority road Lm, the travel lane L1, the opposite lane L2, the non-priority road Ls, and the intersection CL detected by the travel environment recognizer 13*c*. The vehicle information Db may include the information regarding the speed (vehicle speed) of the vehicle 100*a* acquired from the vehicle position estimator 13*b* and the information regarding the vehicles on the priority road Lm (for example, the vehicles 100*a*, and 100*c* to 100*f*) and the vehicle on the non-priority road Ls (for example, the vehicle 100*b*). Even in such a case, it is possible to predict the possibility of merging, crossing, etc. of the vehicle 100*b* under the influence of the mental state of the driver of the vehicle 100*b*.

It is to be noted that the effects described in the specification are merely examples. Effects of the disclosure are not limited to the effects described in the specification. The disclosure may produce other effects than described in the specification.

The example embodiment described above explains an example of a driver assistance apparatus in the case where the subject vehicle travels on a road where drivers keep to the right by law. Needless to say, if the driver assistance apparatus is to be applied to a road where drivers keep to the left by law, right and left settings or the like may be appropriately set in an opposite manner.

As used herein, the term "collision" may be used interchangeably with the term "contact".

Moreover, for example, the disclosure may take the following configurations.

(1)

A driver assistance apparatus including a processor configured to predict behavior of a prediction target vehicle when a non-priority road is present ahead of a first vehicle and the prediction target vehicle is present stopped at a waiting point on the non-priority road or traveling toward the waiting point, the non-priority road merging with or intersecting a priority road including one or more lanes on each side, the processor being configured to:

acquire first data indicating that the prediction target vehicle is present, that second vehicles are present on one or more lanes ahead of the first vehicle, and that an entry space available for entry of the prediction target vehicle is present, among one or more spaces each formed by any adjacent two of the second vehicles on any common lane out of the one or more lanes ahead of the first vehicle;

when it is determined based on the acquired first data that the prediction target vehicle is waiting at the waiting point and that the entry space for the waiting prediction target vehicle is present, estimate waiting time for the prediction target vehicle at the waiting point based on the acquired first data, and when it is determined based on the acquired first data that the prediction target vehicle is traveling toward the waiting point and that the entry space for the traveling prediction target vehicle is present, estimate time to spare until the entry of the prediction target vehicle into the entry space based on the acquired first data; and predict possibility of the entry of the prediction target vehicle into the entry space based on the waiting time or the time to spare.

(2)

The driver assistance apparatus according to (1), in which the processor is configured to estimate, based on the acquired first data, time it takes for the prediction target vehicle to enter the entry space, or time having predetermined correlation with the time, as the time to spare.

(3)

The driver assistance apparatus according to (1) or (2), in which the processor is configured to acquire second data indicating absence of the entry space, and estimate the waiting time based on the first data and the second data.

(4)

The driver assistance apparatus according to any one of (1) to (3), in which the processor is configured to estimate number of vehicles in a predetermined region ahead of the first vehicle, based on the acquired first data, and predict the possibility of the entry of the prediction target vehicle into the entry space, based on the number of the vehicles and the waiting time or the time to spare.

(5)

The driver assistance apparatus according to (4), in which the processor is configured to estimate, based on the acquired first data, number of vehicles N1 near the entry space on the priority road and number of vehicles N2 in an evaluation target region extending, within the priority road, from the position of the first vehicle to near the entry space, and predict the possibility of the entry of the prediction target vehicle into the entry space, based on the number of the vehicles N1, the number of the vehicles N2, and the waiting time or the time to spare.

(6)

The driver assistance apparatus according to (4), in which the processor is configured to estimate, based on the acquired first data, number of vehicles N1 near the entry space on the priority road and number of vehicles N3 in an evaluation target region extending, within a same lane as the first vehicle, from the position of the first vehicle to near the entry space, and predict the possibility of the entry of the prediction target vehicle into the entry space, based on the number of the vehicles N1, the number of the vehicles N3, and the waiting time or the time to spare.

(7)

A vehicle including a processor configured to predict behavior of a prediction target vehicle when a non-priority road is present ahead of a first vehicle and the prediction target vehicle is present stopped at a waiting point on the non-priority road or traveling toward the waiting point, the non-priority road merging with or intersecting a priority road including one or more lanes on each side, the processor being configured to:

acquire data indicating that the prediction target vehicle is present, that second vehicles are present on one or more lanes ahead of the first vehicle, and that an entry space available for entry of the prediction target vehicle is present, among one or more spaces each formed by any adjacent two of the second vehicles on any common lane out of the one or more lanes ahead of the first vehicle;

when it is determined based on the acquired data that the prediction target vehicle is waiting at the waiting point and that the entry space for the waiting prediction target vehicle is present, estimate waiting time for the prediction target vehicle at the waiting point based on the acquired data, and when it is determined based on the acquired data that the prediction target vehicle is traveling toward the waiting point and that the entry space for the traveling prediction target vehicle is present, estimate time to spare until the entry of the prediction target vehicle into the entry space based on the acquired data; and predict possibility of the entry of the prediction target vehicle into the entry space based on the waiting time or the time to spare.

(8)

A driver assistance method including predicting behavior of a prediction target vehicle when a non-priority road is present ahead of a first vehicle and the prediction target vehicle is present stopped at a waiting point on the non-priority road or traveling toward the waiting point, the non-priority road merging with or intersecting a priority road including one or more lanes on each side, the driver assistance method including:

acquiring data indicating that the prediction target vehicle is present, that second vehicles are present on one or more lanes ahead of the first vehicle, and that an entry space available for entry of the prediction target vehicle is present, among one or more spaces each formed by any adjacent two of the second vehicles on any common lane out of the one or more lanes ahead of the first vehicle;

when it is determined based on the acquired data that the prediction target vehicle is waiting at the waiting point and that the entry space for the waiting prediction target vehicle is present, estimating waiting time for the prediction target vehicle at the waiting point based on the acquired data, and when it is determined based on the acquired data that the prediction target vehicle is traveling toward the waiting point and that the entry space for the traveling prediction target vehicle is present, estimating time to spare until the entry of the prediction target vehicle into the entry space based on the acquired data; and predicting possibility of the entry of the prediction target vehicle into the entry space based on the waiting time or the time to spare.

(9)

A driver assistance apparatus including a processor configured to predict behavior of a prediction target vehicle when a non-priority road is present ahead of a first vehicle and the prediction target vehicle is present stopped at a waiting point on the non-priority road or traveling toward the waiting point, the non-priority road merging with or intersecting a priority road including one or more lanes on each side, the processor being configured to:

acquire data indicating that the prediction target vehicle is present, that second vehicles are present on one or more lanes ahead of the first vehicle, and that an entry space available for entry of the prediction target vehicle is present, among one or more spaces each formed by any adjacent two of the second vehicles on any common lane out of the one or more lanes ahead of the first vehicle;

estimate, based on the acquired data, a first degree of congestion near the entry space on the priority road and a second degree of congestion extending, within the priority road, from a position of the first vehicle to near the entry space; and predict possibility of the entry of the prediction target vehicle into the entry space based on the first degree of congestion and the second degree of congestion.

(10)

A driver assistance apparatus including a processor configured to predict behavior of a prediction target vehicle when a non-priority road is present ahead of a first vehicle and the prediction target vehicle is present stopped at a waiting point on the non-priority road or traveling toward the waiting point, the non-priority road merging with or intersecting a priority road including one or more lanes on each side, the processor being configured to:

acquire data indicating that the prediction target vehicle is present, that second vehicles are present on one or more lanes ahead of the first vehicle, and that an entry space available for entry of the prediction target vehicle is present, among one or more spaces each formed by any adjacent two of the second vehicles on any common lane out of the one or more lanes ahead of the first vehicle;

estimate, based on the acquired data, a first degree of congestion near the entry space on the priority road and a third degree of congestion in an evaluation target region extending, within a same lane as the first vehicle, from a position of the first vehicle to near the entry space; and predict possibility of the entry of the prediction target vehicle into the entry space based on the first degree of congestion and the third degree of congestion The travel_ECU 21 illustrated in FIG. 1 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the travel_ECU 21. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the travel_ECU 21 illustrated in FIG. 1.

The invention claimed is:

1. A driver assistance apparatus for a first vehicle, comprising one or more processors configured to:

acquire data including positions and speeds of a prediction target vehicle and a plurality of second vehicles, the data indicating that:

the first vehicle is traveling on a priority road;

the prediction target vehicle is present on a non-priority road that merges with or intersects the priority road ahead of the first vehicle;

the prediction target vehicle is stopped at a waiting point on the non-priority road or is traveling toward the waiting point, the waiting point being a point at which the prediction target vehicle waits before entering the priority road; and the plurality of second vehicles are present on one or more lanes ahead of the first vehicle on the priority road;

calculate inter-vehicle spaces each formed between a preceding one and a following one of two consecutive second vehicles traveling on one lane among the one or more lanes;

recognize, from among the inter-vehicle spaces, a space for which an inter-vehicle space is equal to or greater than a predetermined threshold value;

determine, based on the positions and speeds of the prediction target vehicle and the preceding and following second vehicles that form the space, whether the space satisfies a passing condition for entry of the prediction target vehicle between the preceding and following second vehicles;

when the space satisfies the passing condition, determine the space as an entry space available for entry of the prediction target vehicle;

determine, based on the acquired data, whether the prediction target vehicle is stopped at the waiting point or is traveling toward the waiting point;

when the prediction target vehicle is stopped at the waiting point, estimate a waiting time indicating a time during which the prediction target vehicle is stopped at the waiting point;

when the prediction target vehicle is traveling toward the waiting point, estimate, as a time to spare, a difference between a time at which the prediction target vehicle is predicted to reach the entry space and a current time;

predict an entry possibility indicating a possibility that the prediction target vehicle enters the entry space, based on:

the waiting time when the prediction target vehicle is stopped at the waiting point, or the time to spare when the prediction target vehicle is traveling toward the waiting point; and when the entry possibility is equal to or greater than a predetermined entry possibility value and a collision between the first vehicle and the prediction target vehicle is predicted to occur within a predetermined time, automatically control a brake actuator of the first vehicle to decelerate the first vehicle.

2. The driver assistance apparatus according to claim 1, wherein the one or more processors are configured to estimate the time to spare based on the acquired data as a time it takes for the prediction target vehicle to enter the entry space.

3. The driver assistance apparatus according to claim 1, wherein the one or more processors are configured to estimate the waiting time based on the acquired data and absence data indicating a period during which no entry space satisfying the passing condition was present while the prediction target vehicle was stopped at the waiting point.

4. The driver assistance apparatus according to claim 1, wherein the one or more processors are configured to:

estimate, based on the acquired data, a number of vehicles in a predetermined region ahead of the first vehicle; and predict the possibility based on:

the number of vehicles, and the waiting time when the prediction target vehicle is stopped at the waiting point, or the time to spare when the prediction target vehicle is traveling toward the waiting point.

5. The driver assistance apparatus according to claim 4, wherein the one or more processors are configured to:

estimate, based on the acquired data, a first number of vehicles N1 near the entry space on the priority road, and a second number of vehicles N2 in an evaluation target region extending, within the priority road, from a position of the first vehicle to near the entry space; and predict the entry possibility based on:

the first number of vehicles N1, the second number of vehicles N2, and the waiting time when the prediction target vehicle is stopped at the waiting point, or the time to spare when the prediction target vehicle is traveling toward the waiting point.

6. The driver assistance apparatus according to claim 4, wherein the one or more processors are configured to estimate, based on the acquired data, a first number of vehicles N1 near the entry space on the priority road, and a third number of vehicles N3 in an evaluation target region extending, within a same lane as the first vehicle, from a position of the first vehicle to near the entry space; and predict the entry possibility based on:

the first number of vehicles N1, the third number of vehicles N3, and the waiting time when the prediction target vehicle is stopped at the waiting point, or the time to spare when the prediction target vehicle is traveling toward the waiting point.

7. The driver assistance apparatus according to claim 1, wherein the acquired data is acquired from at least one of:

a sensor of the first vehicle;

road-to-vehicle communication; or vehicle-to-vehicle communication.

8. The driver assistance apparatus according to claim 1, wherein the passing condition includes:

a first condition that, after the preceding second vehicle passes through an intersection, the prediction target vehicle enters the entry space without contacting the preceding second vehicle; and a second condition that, after the prediction target vehicle enters the entry space, the following second vehicle passes through the intersection without contacting the prediction target vehicle.

9. The driver assistance apparatus according to claim 1, wherein the one or more processors are configured to:

call for attention of a driver of the first vehicle when the entry possibility is equal to or greater than a first predetermined entry possibility value and less than a second predetermined entry possibility value;

alert the driver when the entry possibility is equal to or greater than the second predetermined entry possibility value and less than a third predetermined entry possibility value; and automatically control the brake actuator when the entry possibility is equal to or greater than the third predetermined entry possibility value.

10. The driver assistance apparatus according to claim 1, wherein the one or more processors are configured to automatically control the brake actuator at a stage where the collision between the first vehicle and the prediction target vehicle is predicted to occur within three seconds or less.

11. The driver assistance apparatus according to claim 1, wherein when communication with a network environment is difficult, the one or more processors are configured to acquire the data based on sensor data obtained from one or more sensors mounted on the first vehicle.

12. A vehicle comprising one or more processors configured to:

acquire data including positions and speeds of a prediction target vehicle and a plurality of second vehicles, the data indicating that:

the vehicle is traveling on a priority road;

the prediction target vehicle is present on a non-priority road that merges with or intersects the priority road ahead of the vehicle;

the prediction target vehicle is stopped at a waiting point on the non-priority road or is traveling toward the waiting point, the waiting point being a point at which the prediction target vehicle waits before entering the priority road; and the plurality of second vehicles are present on one or more lanes ahead of the vehicle on the priority road;

calculate inter-vehicle spaces each formed between a preceding one and a following one of two consecutive second vehicles traveling on one lane among the one or more lanes;

recognize, from among the inter-vehicle spaces, a space for which an inter-vehicle space is equal to or greater than a predetermined threshold value;

determine, based on the positions and speeds of the prediction target vehicle and the preceding and following second vehicles that form the space, whether the space satisfies a passing condition for entry of the prediction target vehicle between the preceding and following second vehicles;

when the space satisfies the passing condition, determine the space as an entry space available for entry of the prediction target vehicle;

determine, based on the acquired data, whether the prediction target vehicle is stopped at the waiting point or is traveling toward the waiting point;

when the prediction target vehicle is stopped at the waiting point, estimate a waiting time indicating a time during which the prediction target vehicle is stopped at the waiting point;

when the prediction target vehicle is traveling toward the waiting point, estimate, as a time to spare, a difference between a time at which the prediction target vehicle is predicted to reach the entry space and a current time;

predict an entry possibility indicating a possibility that the prediction target vehicle enters the entry space, based on:

the waiting time when the prediction target vehicle is stopped at the waiting point, or the time to spare when the prediction target vehicle is traveling toward the waiting point; and when the entry possibility is equal to or greater than a predetermined entry possibility value and a collision between the vehicle and the prediction target vehicle is predicted to occur within a predetermined time, automatically control a brake actuator of the vehicle to decelerate the vehicle.

13. A driver assistance method comprising:

acquiring data including positions and speeds of a prediction target vehicle and a plurality of second vehicles, the data indicating that:

the vehicle is traveling on a priority road;

the prediction target vehicle is present on a non-priority road that merges with or intersects the priority road ahead of the vehicle;

the prediction target vehicle is stopped at a waiting point on the non-priority road or is traveling toward the waiting point, the waiting point being a point at which the prediction target vehicle waits before entering the priority road; and the plurality of second vehicles are present on one or more lanes ahead of the vehicle on the priority road;

calculating inter-vehicle spaces each formed between a preceding one and a following one of two consecutive second vehicles traveling on one lane among the one or more lanes;

recognizing, from among the inter-vehicle spaces, a space for which an inter-vehicle space is equal to or greater than a predetermined threshold value;

determining, based on the positions and speeds of the prediction target vehicle and the preceding and following second vehicles that form the space, whether the space satisfies a passing condition for entry of the prediction target vehicle between the preceding and following second vehicles;

when the space satisfies the passing condition, determining the space as an entry space available for entry of the prediction target vehicle;

determining, based on the acquired data, whether the prediction target vehicle is stopped at the waiting point or is traveling toward the waiting point;

when the prediction target vehicle is stopped at the waiting point, estimating a waiting time indicating a time during which the prediction target vehicle is stopped at the waiting point;

when the prediction target vehicle is traveling toward the waiting point, estimating, as a time to spare, a difference between a time at which the prediction target vehicle is predicted to reach the entry space and a current time;

predicting an entry possibility indicating a possibility that the prediction target vehicle enters the entry space, based on:

the waiting time when the prediction target vehicle is stopped at the waiting point, or the time to spare when the prediction target vehicle is traveling toward the waiting point; and when the entry possibility is equal to or greater than a predetermined entry possibility value and a collision between the vehicle and the prediction target vehicle is predicted to occur within a predetermined time, automatically controlling a brake actuator of the vehicle to decelerate the vehicle.

* * * * *